United States Patent
Katayama

(10) Patent No.: US 9,315,115 B2
(45) Date of Patent: Apr. 19, 2016

(54) POWER ASSIST DEVICE AND AMBULATORY ASSIST VEHICLE

(71) Applicant: Funai Electric Co., Ltd., Osaka (JP)

(72) Inventor: Takahiro Katayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 177 days.

(21) Appl. No.: 14/289,441

(22) Filed: May 28, 2014

(65) Prior Publication Data
US 2014/0358344 A1    Dec. 4, 2014

(30) Foreign Application Priority Data

May 30, 2013    (JP) .................................. 2013-113681

(51) Int. Cl.
*B60L 15/10*  (2006.01)
*A61H 3/04*  (2006.01)
(Continued)

(52) U.S. Cl.
CPC . *B60L 15/10* (2013.01); *A61G 5/04* (2013.01); *A61H 3/04* (2013.01); *B60L 15/30* (2013.01); *B62B 5/0073* (2013.01); *B62D 51/001* (2013.01); *B62D 51/04* (2013.01); *A61G 7/08* (2013.01); *A61G 7/1048* (2013.01); *A61G 2005/048* (2013.01); *A61H 2003/043* (2013.01); *A61H 2201/1635* (2013.01); *A61H 2201/5007* (2013.01); *A61H 2201/5028* (2013.01); *A61H 2201/5061* (2013.01); *Y02T 10/7258* (2013.01)

(58) Field of Classification Search
CPC ........... B60L 15/10; B60L 15/30; A61H 3/04; A61H 2003/043; A61H 2201/1635; A61H 2201/5061; A61G 5/04; A61G 2005/048; B62B 5/0073; B62D 51/001; B62D 51/04
See application file for complete search history.

(56) References Cited

U.S. PATENT DOCUMENTS 6,502,024 B2 * 12/2002 Ishihara ................. B62D 5/046
180/414
8,423,218 B2 *  4/2013 Koide ...................... B60K 6/46
180/65.285
(Continued)

FOREIGN PATENT DOCUMENTS

CA    EP 2575719 A2 *  4/2013  ............. A61G 5/042
JP    2002-255082 A       9/2002
(Continued)

OTHER PUBLICATIONS

Office Action issued in corresponding European Application No. 14170100.3 dated Nov. 24, 2015 (3 pages).
(Continued)

*Primary Examiner* — Tuan C. To
(74) *Attorney, Agent, or Firm* — Osha Liang LLP

(57) ABSTRACT

A power assist device for assisting a user to operate an object. The power assist device includes a pressure sensor that detects an operating force applied to the object by the user; a motor that outputs and applies a motive force to the object; and a controller. The controller records a history of the operating force detected by the pressure sensor; detects a periodically fluctuating component of the operating force based on the history of the operating force; calculates a component of a current operating force caused by motion of the user operating the object; calculates a correction value that excludes the component caused by motion of the user from the current operating force; calculates a power assist force based on the correction value; and outputs the power assist force as the motive force of the motor.

20 Claims, 18 Drawing Sheets

(51) Int. Cl.
*B60L 15/30* (2006.01)
*A61G 5/04* (2013.01)
*B62B 5/00* (2006.01)
*B62D 51/00* (2006.01)
*B62D 51/04* (2006.01)
*A61G 7/08* (2006.01)
*A61G 7/10* (2006.01)

(56) References Cited

U.S. PATENT DOCUMENTS

| | | | | |
|---|---|---|---|---|
| 2005/0279551 | A1* | 12/2005 | LoPresti | G01S 17/936 180/167 |
| 2006/0085113 | A1* | 4/2006 | Tamaizumi | B62D 5/0463 701/41 |
| 2006/0261569 | A1* | 11/2006 | Delhotal | A61G 5/00 280/87.021 |
| 2008/0231006 | A1* | 9/2008 | Van Eeden | A61G 5/043 280/7.15 |
| 2010/0026222 | A1* | 2/2010 | Yoshida | B60K 6/445 318/400.22 |
| 2011/0282551 | A1* | 11/2011 | Sasaki | B62D 5/0463 701/42 |
| 2012/0029696 | A1* | 2/2012 | Ota | A61H 3/04 700/250 |
| 2012/0116545 | A1* | 5/2012 | Yasui | G05B 13/042 700/30 |
| 2012/0330510 | A1* | 12/2012 | Kawase | B62D 5/0469 701/41 |
| 2013/0233639 | A1* | 9/2013 | Kodato | B62D 5/0463 180/446 |
| 2013/0268161 | A1* | 10/2013 | Izutani | B62D 5/065 701/42 |

FOREIGN PATENT DOCUMENTS

| | | | | |
|---|---|---|---|---|
| JP | 2005-075043 A | | 3/2005 | |
| WO | 9930959 A1 | | 6/1999 | |
| ZA | CA 2540169 C | * | 3/2013 | A61G 5/043 |

OTHER PUBLICATIONS

Extended European Search Report issued in corresponding European Application No. 14170100.3 dated Sep. 19, 2014 (5 pages).

* cited by examiner

POWER ASSIST DEVICE AND AMBULATORY ASSIST VEHICLE

BACKGROUND

1. Technical Field

The present invention relates to a power assist device that assists the travel of a vehicle driven by human strength and to an ambulatory assist vehicle having the power assist device that assists the walking of an operator.

2. Background Art

An ambulatory assist vehicle such as a handcart, a wheelchair, a pushcart and the like is made so as to move (travel) when an operator pushes on a grip part. In recent years, this type of ambulatory assist vehicle has a power assist function internally that assists walking using output torque from an electric motor. The ambulatory assist vehicle with this type of power assist function has a sensor for detecting input (operating force) from a hand of the operator in the grip part provided on the ambulatory assist vehicle. Furthermore, it has a control unit for controlling the electric motor so as to output the power assist force determined based on the operating force from the operator as detected by the sensor.

For example, in the power assist walking device described in Patent Reference 1, when an input value detected by a sensor is a maximum value that is a fixed fluctuation value (first fluctuation value) or less, it is determined that the power assist walking device has moved at the same speed as the operator. Furthermore, power assist is performed using an output value that is proportional to a reference value given based on the maximum value of the input value. Additionally, when the absolute value of the difference between the input value and the reference value is a separately determined difference value (second fluctuation value), that input value newly replaces the reference and is used to perform power assist. By performing power assist in this way, the power assist walking device can be made to travel smoothly in accordance with the walking speed of the operator.

DOCUMENTS OF THE RELATED ART

Patent Documents

[Patent Reference 1] Japanese Unexamined Patent Application No. 2005-75043

When moving pushing an ambulatory assist vehicle, an operator has the perception of walking at a fixed speed and of pushing the ambulatory assist vehicle using a fixed amount of force, but, in reality, it is well know that an operating force detected by a sensor fluctuates (swings) based on operator gait and balance. Furthermore, in addition to this, a load required to move the ambulatory assist vehicle fluctuates with slight changes in gradient or the wind and the like and the operating force also fluctuates based on these types of load fluctuations.

The power assist walking device described in Patent Document 1 is configured to assist using a fixed power assist force when a fluctuation range of the operating force is within a pre-determined fluctuation value. Therefore, the fluctuations of the operating force are not caused by the walking of the operator but are in conjunction with the kind of load fluctuation described above so that assisting is done using a fixed power assist force as long as the fluctuation range is small and thus the assisting and the operating feel of the operator can sometimes get out of synch and cause a sense of discomfort.

One or more embodiments of the present invention provide a power assist device that performs a power assist that is comfortable for the operator and an ambulatory assist vehicle that makes use thereof.

SUMMARY

According to one or more embodiments of the present invention, a power assist device for assisting a user to operate an object may comprise a pressure sensor that detects an operating force applied to the object by the user; a motor that outputs and applies a motive force to the object; and a controller that may record a history of the operating force detected by the pressure sensor; detect a periodically fluctuating component of the operating force based on the history of the operating force; calculate a component of a current operating force caused by motion of the user operating the object; calculate a correction value that excludes the component caused by motion of the user from the current operating force; calculate a power assist force based on the correction value; and output the power assist force as the motive force of the motor.

With the power assist device according to one or more embodiments of the present invention, power assist force may be determined from a correction value that may exclude the periodically fluctuating component of the operating force based on the operating force detected by the pressure sensor and thus amplification by the power assist force of the operating force caused by the behavior of the operator may be suppressed. In this way, for example, the fluctuation of the operating force caused by the behavior of the operator may not easily amplify thus suppressing any sense of discomfort to the operator.

According to one or more embodiments, the controller may detect the periodically fluctuating component of the operating force every time a fixed amount of time passes while the user is operating the object. By configuring in this way, for example, even if the period of the fluctuation caused by the operator changes, a periodically fluctuating component of the operating force that is aligned with that change may be detected and thus it may be possible to provide a power assist force that is comfortable for the operator to the object to be operated.

According to one or more embodiments, the controller may use the history of the operating force only after a predetermined amount of time passes after the user starts operating the object to detect the periodically fluctuating component of the operating force. By configuring in this way, the periodically fluctuating component of the operating force caused by the behavior of the operator may be detected accurately, because the history of operating force at operation start when variations are prone to be large may not be used. In this way, it may be possible to give a power assist force that is comfortable for the operator to the object to be operated.

According to one or more embodiments, a motion sensor may detect a resting state of the object, wherein the controller erases the history of the operating force and the periodically fluctuating component of the operating force when the motion sensor detects that the resting state of the object has exceeded a fixed amount of time. By configuring in this way, it may be determined that the operator is not using the power assist device based on the fact that the object to be operated has been at rest for a fixed amount of time. Furthermore, the periodically fluctuating component of the operating force caused by the behavior of the operator may be detected accurately even when the period of the fluctuation of the operating force changes due to the object to be operated being operated by a different operator. In this way, it may be possible to give a power assist force that is comfortable for the operator to the object to be operated.

According to one or more embodiments, the motor may apply the power assist force to a wheel of an ambulatory assist vehicle. It is possible to make the operator comfortable by reducing the force from the operator for pushing the ambulatory assist vehicle thus reducing the burden on the operator.

According to one or more embodiments, the periodically fluctuating component of the operating force applied by the user may be caused by the user walking. It may be possible to make the operator comfortable by reducing the force from the operator for pushing the ambulatory assist vehicle thus reducing the burden on the operator.

According to one or more embodiments, the component caused by the motion of the user may be calculated based on frequency and amplitude of the periodically fluctuating component.

According to one or more embodiments of the present invention, a method of operating a power assist device for assisting a user to operate an object may comprise detecting an operating force applied to the object by the user; outputting and applying a motive force to the object; recording a history of the detected operating force; detecting a periodically fluctuating component of the operating force based on the history of the operating force; calculating a component of a current operating force caused by motion of the user operating the object; calculating a correction value that excludes the component caused by the motion of the user from the current operating force; calculating a power assist force based on the correction value; and outputting the power assist force as the motive force.

According to the present invention, a power assist device that may perform a power assist that is comfortable for an operator and an ambulatory assist vehicle that makes use thereof may be provided.

DETAILED DESCRIPTION

Embodiments of the present invention will be described hereinafter with reference to the drawings.

First Example

Figure 1A:
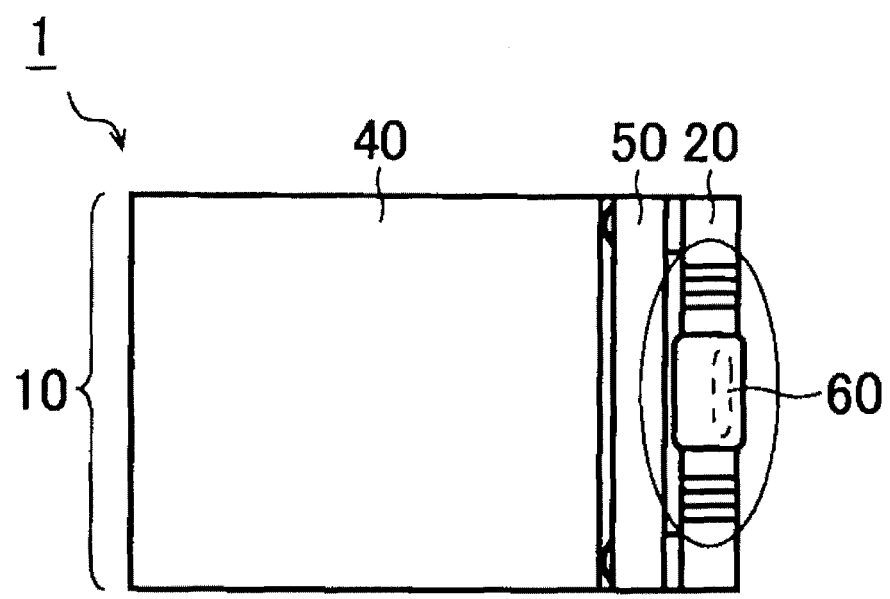
FIG. 1A is a plan view of one example of an ambulatory assist vehicle using a power assist device according to one or more embodiments of the present invention.
Figure 1B:
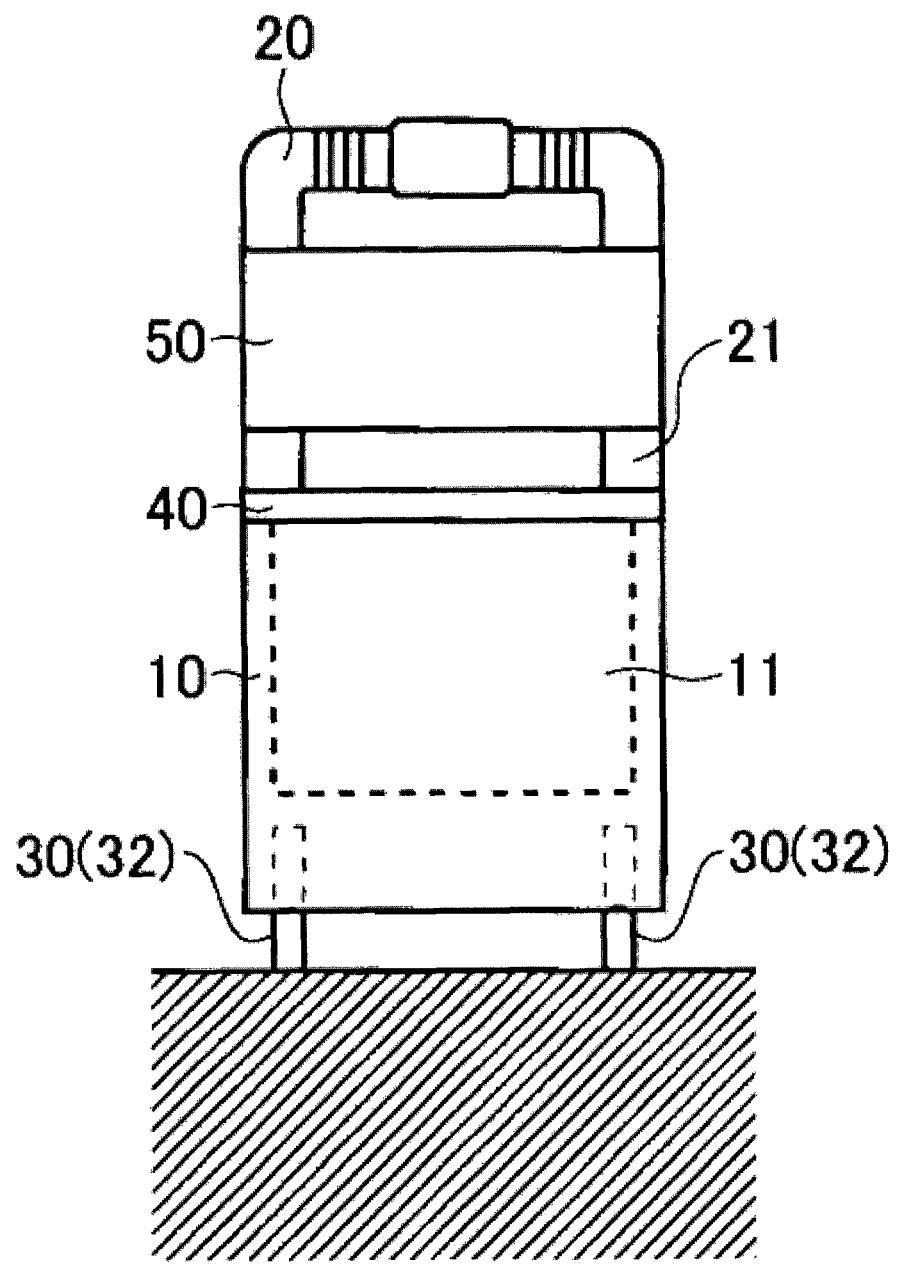
FIG. 1B is an elevation view of the example of the ambulatory assist vehicle using the power assist device according to one or more embodiments of the present invention.
Figure 1C:
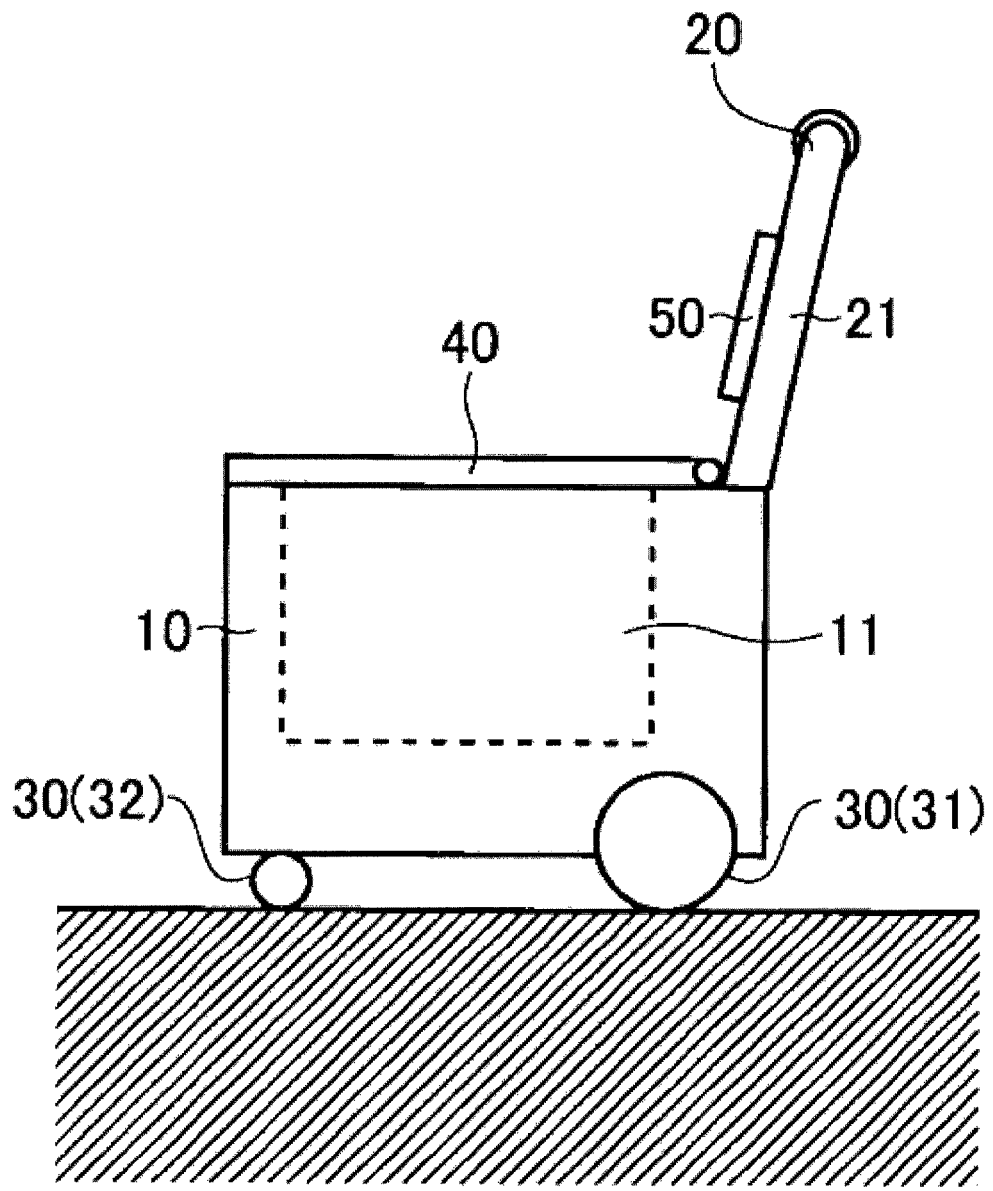
FIG. 1C is a left side view of the example of the ambulatory assist vehicle using the power assist device according to one or more embodiments of the present invention.
Figure 1D:
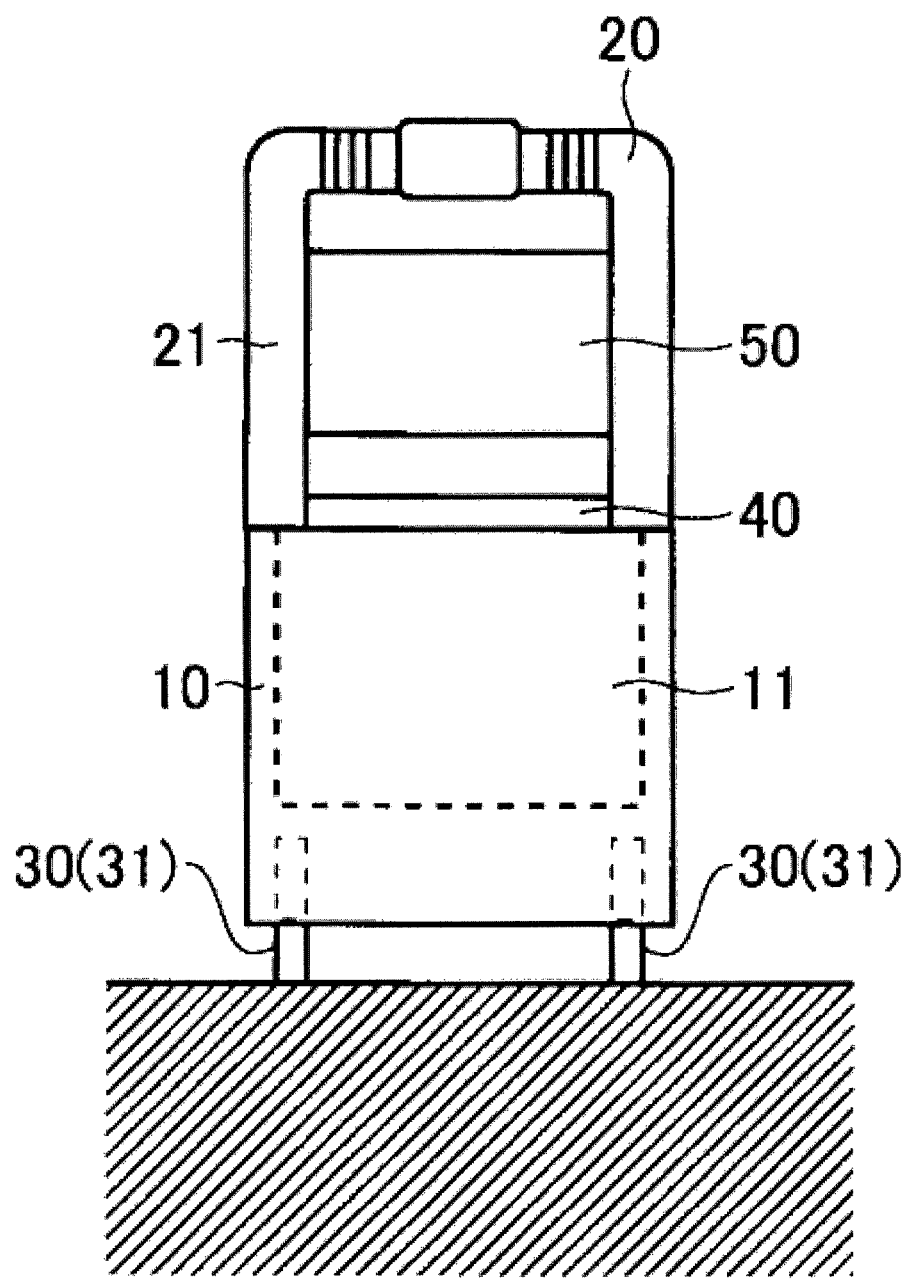
FIG. 1D is a rear view of the example of the ambulatory assist vehicle using the power assist device according to one or more embodiments of the present invention.
Figure 1E:
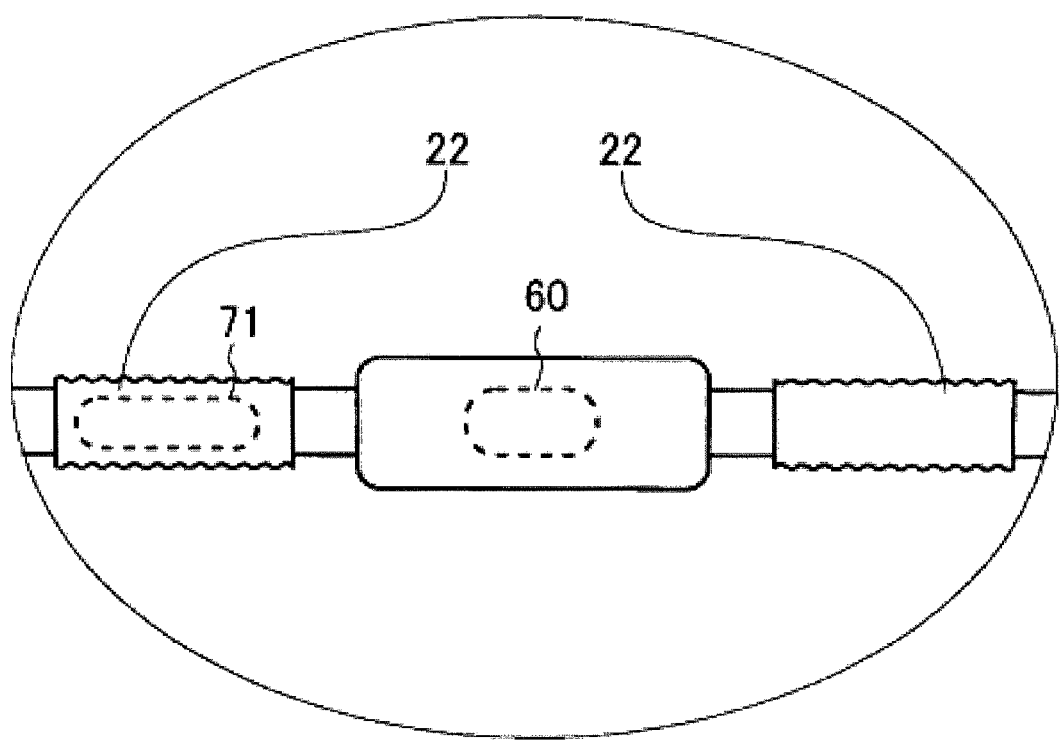
FIG. 1E is an enlarged view of a grip part of the example of the ambulatory assist vehicle using the power assist device according to one or more embodiments of the present invention.
Figure 2:
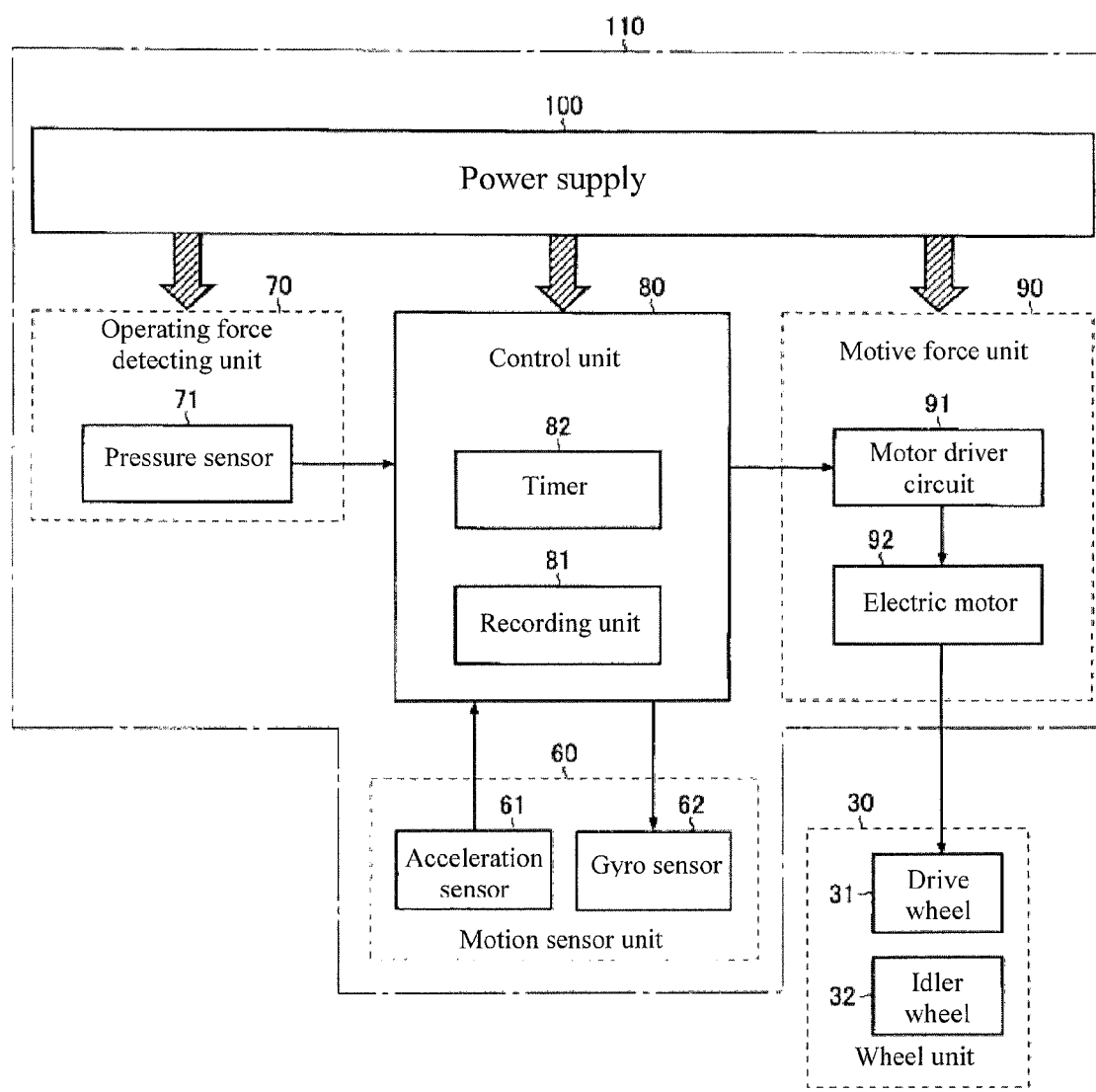
FIG. 2 is a block diagram of one example of a power assist device according to one or more embodiments of the present invention.

FIG. 1 is an external view illustrating one example of an ambulatory assist vehicle using a power assist device according to one or more embodiments of the present invention and FIG. 2 is a block diagram illustrating one example of the power assist device according to one or more embodiments of the present invention. FIG. 1A schematically depicts a plan view of the ambulatory assist vehicle, FIG. 1B schematically depicts a front view (elevation view) thereof, FIG. 1C schematically depicts a left side view thereof, FIG. 1D schematically depicts as rear view thereof, and FIG. 1E schematically depicts an enlarged view of a grip part thereof.

The ambulatory assist vehicle 1 is a manually propelled vehicle (a so called, silver car) used as a basket for carrying baggage or a seat for resting that simultaneously assists the walking of a user or an operator (on the main, an elderly person with weak legs). As illustrated in FIG. 1 and FIG. 2, the ambulatory assist vehicle 1 has a vehicle body part 10, a grip part 20, a wheel unit 30, a top plate part 40, a backrest part 50 and a power assist device 110. Furthermore, the power assist device 110 has a motion sensor unit 60 (e.g., a motion sensor), an operating force detecting unit 70 (e.g., a pressure sensor), a control unit 80 (e.g., a controller), a motive force unit 90 (e.g., a motor) and a power supply 100.

Vehicle body part 10 is the chassis (framework) of the ambulatory assist vehicle 1 to which the configuring elements 20-100 introduced earlier are attached. Furthermore, baggage compartment 11 is provided on the inside of the vehicle body part 10 (below top plate part 40) as a space to store baggage. Stainless steel or an aluminum alloy can be used as the material for forming the vehicle body part 10.

The grip part 20 is a member for the operator to grip while walking and is connected to the vehicle body part 10 through a support part 21. By gripping the grip part 20 with one or both hands and applying human strength, the operator can move (frontwards and backwards), stop and divert the ambulatory assist vehicle 1. A non-slip grip 22 may be provided on the grip part 20. Furthermore, a height adjusting mechanism may be provided on either the grip part 20 or the support part 21.

The wheel unit 30 is an annular member for moving the vehicle body part 10 along the ground by rotating in unison with the walking of the operator. The wheel unit 30 includes a drive wheel 31 that rotates on an axle through driving force from human strength and (or) the motive force unit 90 and a idler wheel 32 (free wheel) for changing direction.

The top panel part 40 is a plate member that covers the baggage compartment 11 and is attached to the vehicle body part 10 so as to be able to open and close. Furthermore, the top plate part 40 is configured so that the operator can sit down when the ambulatory assist vehicle 1 is in a state of rest.

The backrest part 50 is a plate-like member against which the operator can lean while sitting. The backrest part 50 may be attached to the support part 21 or may be provided integrated with the vehicle body part 10.

The motion sensor unit 60 is a sensor for detecting the state of the ambulatory assist vehicle 1 and includes an acceleration sensor 61 and a gyro sensor 62. The acceleration sensor 61 is a sensor for detecting acceleration in conjunction with the movement of the ambulatory assist vehicle 1. Examples of the acceleration sensor 61 include sensors that can detect acceleration in directions along three axes that run at right angles to each other; depth, width, and height.

The gyro sensor 62 is a sensor for detecting the inclination (angular velocity) of the ambulatory assist vehicle 1. Examples of the gyro sensor 62 include sensors that detect angular velocity around the three axes; depth, width, and height. The motion sensor unit 60 according to one or more embodiments of the present invention uses a six-axis motion sensor that combines the acceleration sensor 61 and the gyro sensor 62 on a single chip. Furthermore, the motion sensor unit 60 in the ambulatory assist vehicle 1 is provided in the grip part 20 that is close to the operator but is not limited to this and may be provided in the vehicle body part 10.

The operating force detecting unit 70 has a pressure sensor 71 disposed inside the grip 22 of the grip part 20. The pressure sensor 71 is attached so as to be able to detect the pressure of the movement direction of the ambulatory assist vehicle 1 acting on the grip 22 when the operator operates (mainly pushes) the grip 22 of the grip part 20. The pressure sensor 71 may be disposed in the grip 22 on the left side as the operator faces the ambulatory assist vehicle 1 in the ambulatory assist vehicle 1 according to one or more embodiments of the present invention but is not limited to this and may be disposed inside the grip 22 on the right side. And, furthermore, pressure sensor 71 may be provided on both the left and right sides of the grip 22. The pressure sensor may be a sensor that is well-known conventionally and thus a detailed description thereof is omitted.

Furthermore, a pressure sensor that detects operating input from the hand of the operator is provided in the operating force detecting unit 70 in the ambulatory assist vehicle 1 of one or more embodiments of the present invention, but is not limited to this. For example, a sensor that detects the amount of deflection of the support part 21 when the operating force is input may be attached to the support part 21. For example, a stain gauge, a pressure sensor and the like may be used as this kind of sensor.

The control unit 80 is a logic circuit (a circuit including an MPU and a CPU) that provides overall control of the motion sensor unit 60, the operating force detecting unit 70 and the motive force unit 90, that is, the power assist device 110. The control unit 80 has a recording unit 81 that records all types of information and a timer 82 for obtaining the time. The recording unit 81 is for the purpose of recording information and examples thereof include read-only ROM, read-writable RAM and the like. The timer 82 may detect time and is conventionally well-know.

The control unit 80 has a function that, for example, performs drive control (power assist) of the motive force unit 90 based on an input signal from the motion sensor unit 60 and the operating force detecting unit 70. Furthermore, the control unit 80 detects the attitude (horizontal, tilted back, tilted forward and the like), movement direction (forward, backward, left and right rotation and the like) and movement speed and the like of the ambulatory assist vehicle 1 based on the input signal from the motion sensor unit 60. For example, when the operating force detected by the operating force detecting unit 70 is 0 and the movement speed is 0, the ambulatory assist vehicle 1 is determined to be at rest. The control unit 80 is able to recognize the attitude and the operating state of the ambulatory assist vehicle 1 from the input signal from the motion sensor unit 60. A description will be provided of the details of the operation of the control unit 80.

The motive force unit 90 outputs driving force against the ambulatory assist vehicle 1 (actually, drive wheel 31) in order to assist the operation of the operator in accordance with instructions from the control unit 80. Therefore, the motive force unit 90 has an electric motor 92 and a motor driver circuit 91 that controls the electric power supplied to the electric motor 92.

The power supply 100 may supply electric power to the motion sensor unit 60, the operating force detecting unit 70, the control unit 80 and the motive force unit 90. A secondary battery (a lithium-ion battery, a nickel-hydrogen battery and the like) that can be attached to the vehicle body part 10 may be used as the power supply 100.

Furthermore, the ambulatory assist vehicle 1 has the power assist device 110 that includes the motion sensor unit 60, the operating force detecting unit 70, the control unit 80, the motive force unit 90 and the power supply 100. With the ambulatory assist vehicle 110, the operating force that operates (pushes) the ambulatory assist vehicle 1 of the operator is assisted by the performance of the power assist from the power assist device 110.

The behavior of the ambulatory assist vehicle 1 shown above will be described with reference to the drawings. First, the detection of the operating force by the operating force detection unit 70 will be described. The operating force detecting unit 70 detects the operating force from the operator at each fixed period (at fixed periods). Furthermore, operating force information detected by the operating force detecting unit 70 is transmitted as a signal to the control unit 80. The control unit 80 extracts the information of the operating force from the transmitted signal to obtain the operating force level normalized using a reference value. Furthermore, the timer 82 acquires the time from the start of the detection of the operating force by the operating force detecting unit 70 until the operating force is detected (the present). Furthermore, the control unit 80 obtains from the timer 82 normalized time from normalizing the time the operating force detecting unit 70 detected the operating force by the period the operating force detecting unit 70 detects the operating force. The graph illustrated in FIG. 3 arranges the operating force level in the order of the normalized time.

Figure 3:
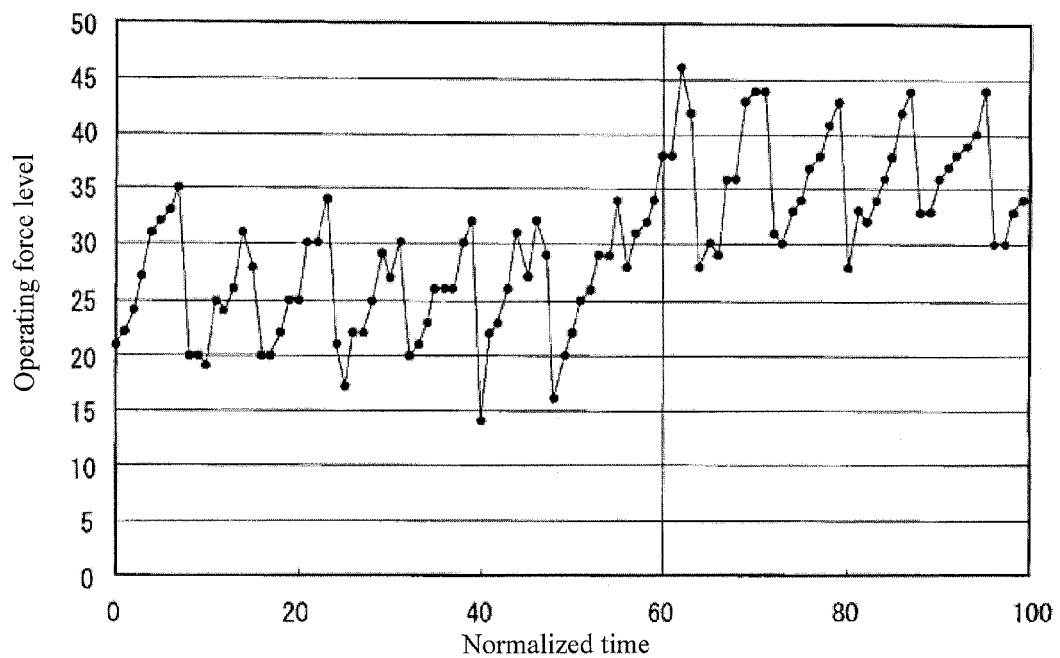
FIG. 3 is a chart illustrating operating force fluctuation from when an operator operates the ambulatory assist vehicle according to one or more embodiments of the present invention.

FIG. 3 is a chart illustrating operating force fluctuation from when an operator operates the ambulatory assist vehicle. The vertical axis in FIG. 3 is the operating force level normalized by the operating force detected by the operating force detecting unit 70 and the horizontal axis is the normalized time normalized by the time at the point in time at which the operating force was detected by the operating force detecting unit 70. As described above, the normalized time is the time from the start of the detection of the operating force until detection normalized by period that shows the order in which the operating force was detected.

It can be seen by observing the graph in FIG. 3 that the operating force level is fluctuating periodically to some degree. Furthermore, it can be seen in the graph in FIG. 3 that the operating force level becomes larger overall after the normalized time exceeds 60. As illustrated in the graph in FIG. 3, the operating force input from the operator to the ambulatory assist vehicle 1 is not fixed but is always fluctuating.

The fluctuation of the operating force from the operator to the ambulatory assist vehicle 1 will be described. When a person (the operator) walks, walking speed viewed over short periods of time fluctuates periodically even when the perception is that of walking at a fixed speed; in other words, the walking speed of the person fluctuates due to a walking rhythm (behavior of the operator). Furthermore, when the operator operates the ambulatory assist vehicle 1 while walking, a periodically fluctuating component caused by an operator's motion, e.g., the walking rhythm, is also included in the operating force from when the operator operates (pushes) the ambulatory assist vehicle 1. For example, the operating force level in the graph in FIG. 3 is influenced by the periodically fluctuating component caused by the walking rhythm of the operator and thus a certain degree of periodic fluctuation can be observed.

On the other hand, there is fluctuation in the operating force toward the ambulatory assist vehicle 1 from the operator that is not caused by walking rhythm. When the ambulatory assist vehicle (and the operator) encounters a change in pathway such as an incline, a step or a recess and the like or when making contact with an external object and the like, the load on the ambulatory assist vehicle 1 changes due to external causes and thus the operating force can sometimes change. For example, it can be observed in the graph in FIG. 3 of a component of fluctuation from an external cause of the operating force that the operating force level becomes larger overall in the region where normalized time exceeds about 60.

For example, the operator attempts to operate (push) the ambulatory assist vehicle 1 in conjunction with walking. Fluctuation caused by the walking rhythm of the operator is synchronized with the walking rhythm and thus the operator does not really recognize the fluctuation. That is, the operator recognizes that when the fluctuation of the operating force is only that caused by the walking rhythm of the operator (for example, when walking a smooth, flat pathway), that a fixed operating force is being applied against the ambulatory assist vehicle 1. On the other hand, when the load of the ambulatory assist vehicle 1 fluctuates and the operating force fluctuates from an external cause, the operator recognizes that the operating force of the ambulatory assist vehicle 1 is changing (that the force required for operation has become more or less burdensome).

Furthermore, if the power assist force is determined based on operating force that includes the component caused by the walking rhythm when power assist is performed on the ambulatory assist vehicle 1, the component caused by the walking rhythm is amplified thus giving the operator a sense of discomfort. In order to suppress this sort of discomfort, the control unit 80 of the power assist device 110 of the present invention calculates a correction value that excludes the component caused by the walking rhythm of the operator from the operating force and calculates the power assist force based on the correction value.

Then, in the control unit 80 of the power assist device 110 of the present invention, the history of the operating force level over a fixed period is recorded (sampled) in the recording unit 81 and "the periodically fluctuating component of the operating force level caused by the walking rhythm" is recorded in the recording unit 81. The control unit 80 calculates "the component caused by the walking rhythm of the operating level" that corresponds to the time the operating force was detected by the operating force detecting unit 70 from "the periodically fluctuating component of the operating force level caused by the walking rhythm." Furthermore, the control unit 80 calculates the correction value by subtracting "the component caused by the walking rhythm of the operating force level" from the operating force level based on the operating force detected by the operating force detecting unit 70. Furthermore, the control unit 80 determines the power assist force by multiplying the reference value of the power assist force by the correction value.

Here, the difference between "the periodically fluctuating component of the operating force level caused by the walking rhythm" and "the component caused by the walking rhythm of the operating level" will be described. The periodically fluctuating component of the operating force level caused by the walking rhythm represents an aggregation of the operating level showing the fluctuation of the operating level that appears at a certain period through the walking. The component caused by the walking rhythm of the operating level illustrates one piece of data within the periodically fluctuating component of the operating force level caused by the walking rhythm. And, therefore, the component will be the periodically fluctuating component R of the operating force level caused by the walking rhythm (the periodically fluctuating component of the operating force level caused by the behavior of the operator) in order to make discrimination in the following description easier. And, furthermore, the component will be displayed as the component r caused by the walking rhythm of the operating level (the component caused by the behavior of the operator of the operating force).

Figure 4:
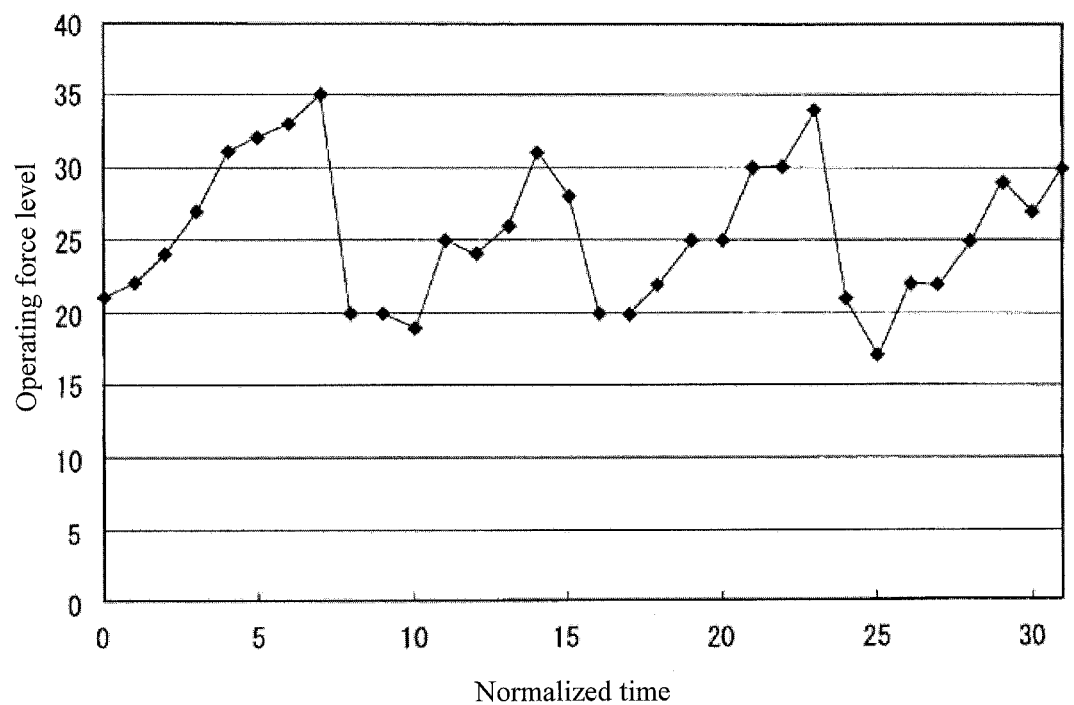
FIG. 4 is a chart illustrating a history of operating force level sampled over a fixed period of time of the operating force according to one or more embodiments of the present invention.
Figure 5:
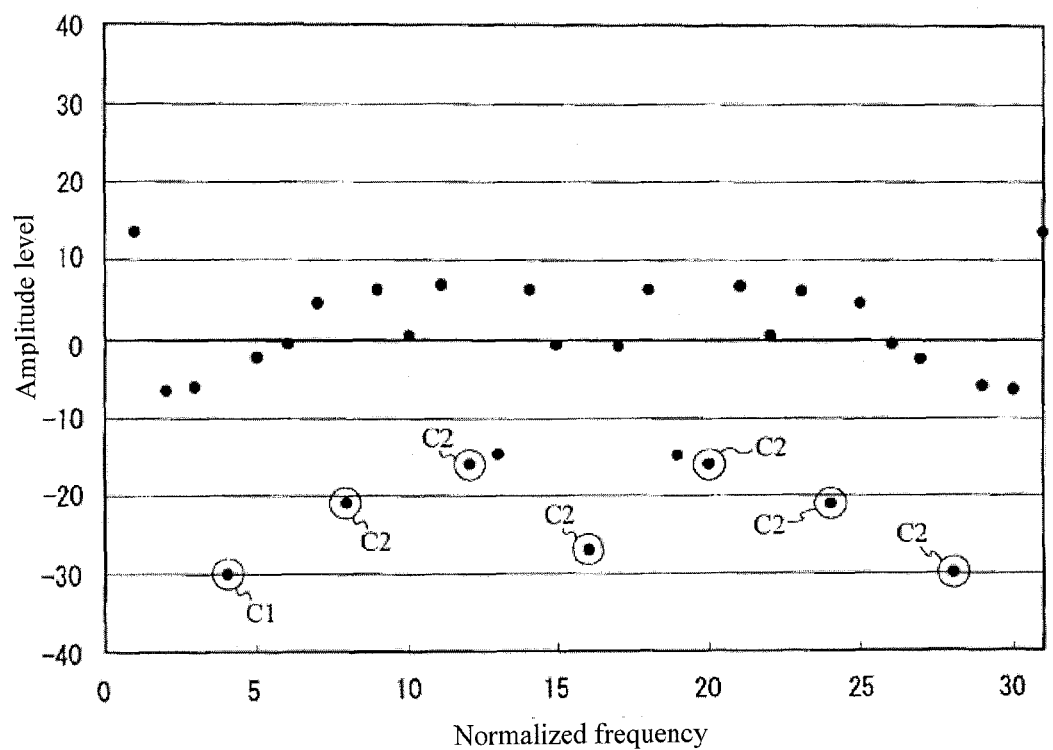
FIG. 5 is a chart illustrating the result of transforming the history of the operating force level illustrated in FIG. 4 into a frequency domain according to one or more embodiments of the present invention.
Figure 6:
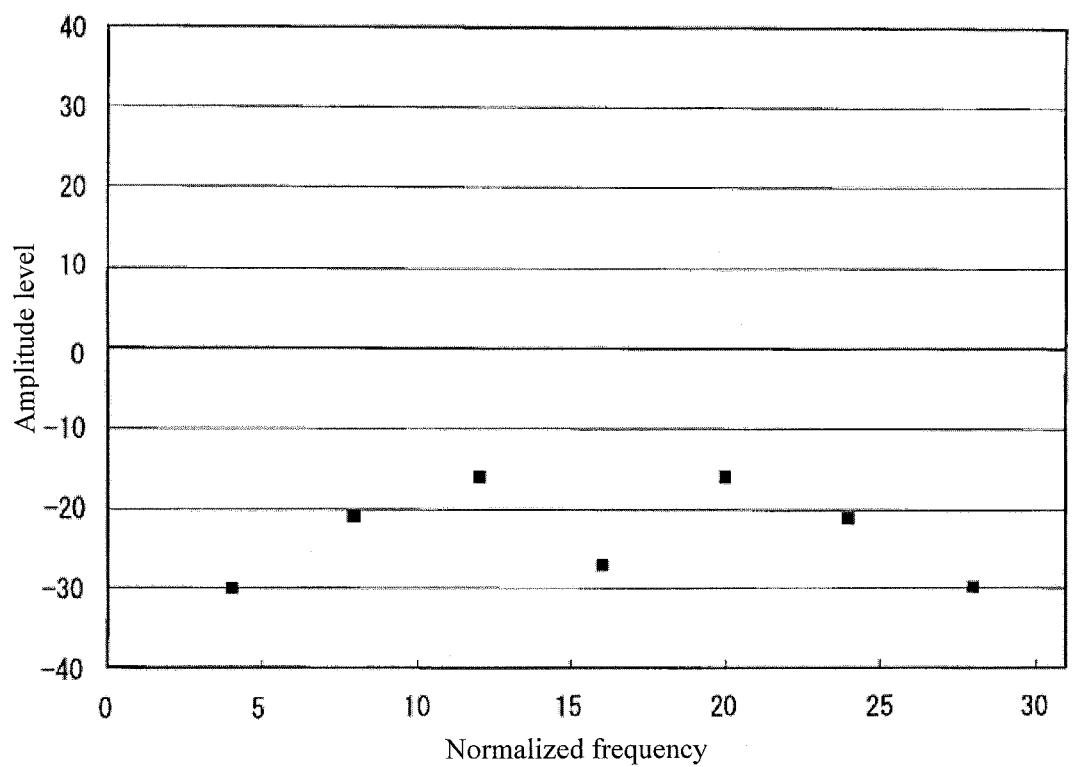
FIG. 6 is a chart of extracted and plotted data illustrating a frequency component caused by a walking rhythm from the plot in FIG. 5 according to one or more embodiments of the present invention.
Figure 7:
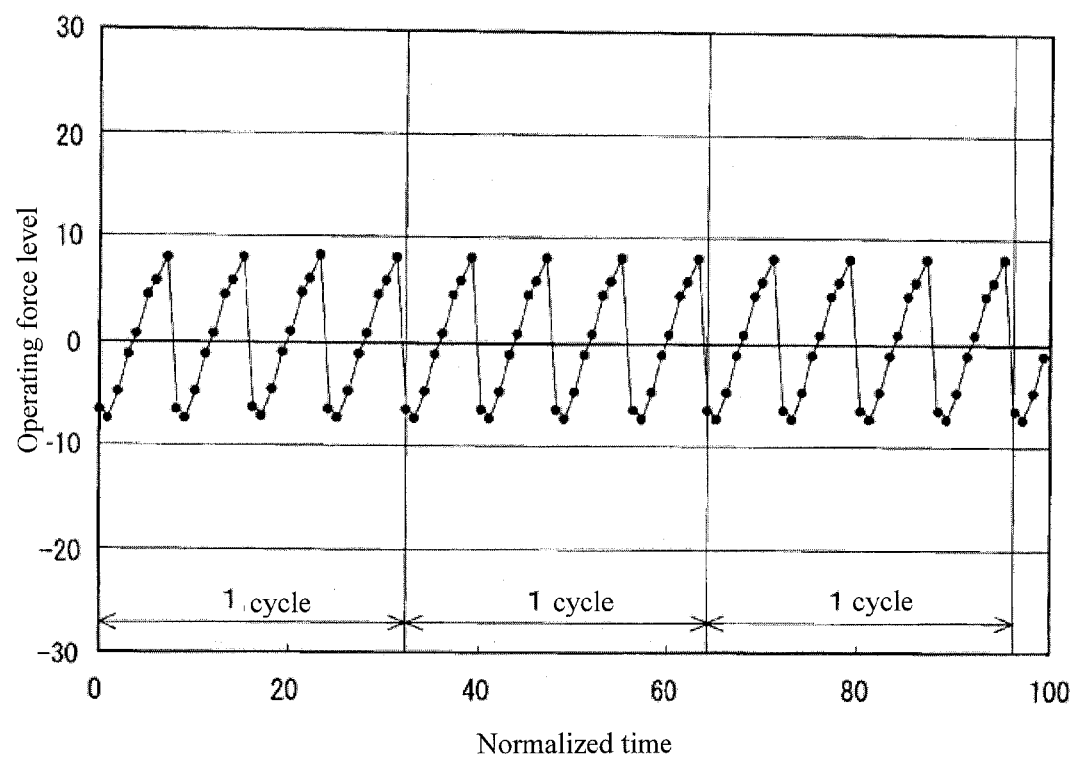
FIG. 7 is a chart illustrating a periodically fluctuating component of the operating force level caused by the walking rhythm according to one or more embodiments of the present invention.

Next, the method for removing the periodically fluctuating component caused by the walking rhythm of the operator from the operating forced detected by the operating force detecting unit 70 will be described with reference to the drawings. FIG. 4 is a chart illustrating a history of operating force level sampled over a fixed period of time of the operating force, FIG. 5 is a chart illustrating the result of transforming the history of the operating force level illustrated in FIG. 4 into a frequency domain and FIG. 6 is a chart of extracted and plotted data illustrating a frequency component caused by the walking rhythm from the plot in FIG. 5. Furthermore, FIG. 7 is a chart illustrating a periodically fluctuating component of the operating force level caused by the walking rhythm.

FIG. 4 illustrates the relationship between the operating force level and the normalized time across 32 detections of the operating force from the start of the detection of the operating force by the operating force detecting unit 70 of the ambulatory assist vehicle 1 (normalized time 0 to 31).

The graph illustrated in FIG. 4 is data aligned in a time series of the data of the operating force level recorded in the recording unit 81 of the control unit 80. The distribution of the operating force level illustrated in FIG. 4 is the same as that which detected the data of normalized time 0-31 from the data of the operating level force (normalized time 0-99) illustrated in FIG. 3.

The base frequency of the component caused by the walking rhythm of the operating level matches the period of time from when one foot strikes the ground to when the same foot strikes the ground again. To the degree that this value is caused by the walking rhythm of a person, the value will be within a fixed range even when an unspecified number of users are assumed. Furthermore, the amplitude thereof will also be within a fixed range. The control unit 80 in the power assist device 110 uses this fact to transform the time series (discretized) data of the operating force level illustrated in FIG. 4 into a frequency domain. Discrete Fourier Transform is used in one or more embodiments of the present invention for this transformation to a frequency domain. And, furthermore, the transformation is not limited to Discrete Fourier Transform and thus any transform method that is able to able to transform discretized data into a frequency domain may be used.

The discretized data of the operating force level illustrated in FIG. 4 is distributed as illustrated in FIG. 5 when transformed into a frequency domain. The horizontal axis in FIG. 5 is normalized frequency while the vertical axis is amplitude (normalized amplitude level). Furthermore, a component having the largest amplitude among the components fitting in a range assumed for a frequency and amplitude from a frequency component of the frequency domain illustrated in FIG. 5 is treated as the base frequency. In the power assist device 110 of the present invention, the periodically fluctuating component of the base frequency and all periodically fluctuating components that are integral multiples of the base frequency are summed and treated as a frequency component caused by the walking rhythm.

The control unit 80 performs extraction of the base frequency using, for example, the following method. First, in the data shown in FIG. 5, the control unit 80 assumes that the frequency caused by the walking rhythm of a person is in a range of 1 to 10 of the normalized frequency and then selects and determines the data from among these with the largest amplitude (the data surrounded by circle C1 in FIG. 5) as the base frequency. And also, the control unit 80 selects and determines data with a frequency that is an integral multiple of C1 (in FIG. 5, six pieces of data surrounded by circles C2 in FIG. 5) (see FIG. 6). Furthermore, a plurality of data with large amplitudes in the range of the frequency caused by the walking rhythm of a person may be extracted as the base frequency, each data group with a frequency that is an integral multiple may be selected, and amplitude sizes among the data groups comprehensively compared and may be determined.

Furthermore, the control unit 80 determines the component caused by the walking rhythm of the operating level based on the seven pieces of data illustrated in FIG. 6. Further, the control unit 80 uses a transformation for the seven pieces of data illustrated in FIG. 6 that is the inverse of that used to transform the data of the operating force level into the frequency domain (herein, referred to as inverse Discrete Fourier Transform) to transform the data into data of the original operating force level from the frequency domain.

The component caused by the walking rhythm of the operating level can be obtained in this way. The result of this is illustrated in FIG. 7. The data illustrated in FIG. 7 fluctuates repeatedly over a fixed period (normalized time 0-31) and this illustrates the periodically fluctuating component R of the operating force level caused by the walking rhythm. The periodically fluctuating component R of the operating force level caused by the walking rhythm illustrated in FIG. 7 has 32 of the components r caused by the walking rhythm of the operating level and fluctuates periodically. Normalized time is 0-99 in FIG. 7, and these are connected and illustrated so as to repeat the periodically fluctuating component R of the operating force level caused by the walking rhythm.

As described above, the component caused by the walking rhythm of the operator is included in the operating force level illustrated in FIG. 3. Therefore, by subtracting the corresponding component r caused by the walking rhythm of the periodically fluctuating component R of the operating force level caused by the walking rhythm illustrated in FIG. 7 from the operating force level illustrated in FIG. 3, the component caused by the walking rhythm can be removed from the operating force level. The result thereof is illustrated in FIG. 8.

Figure 8:
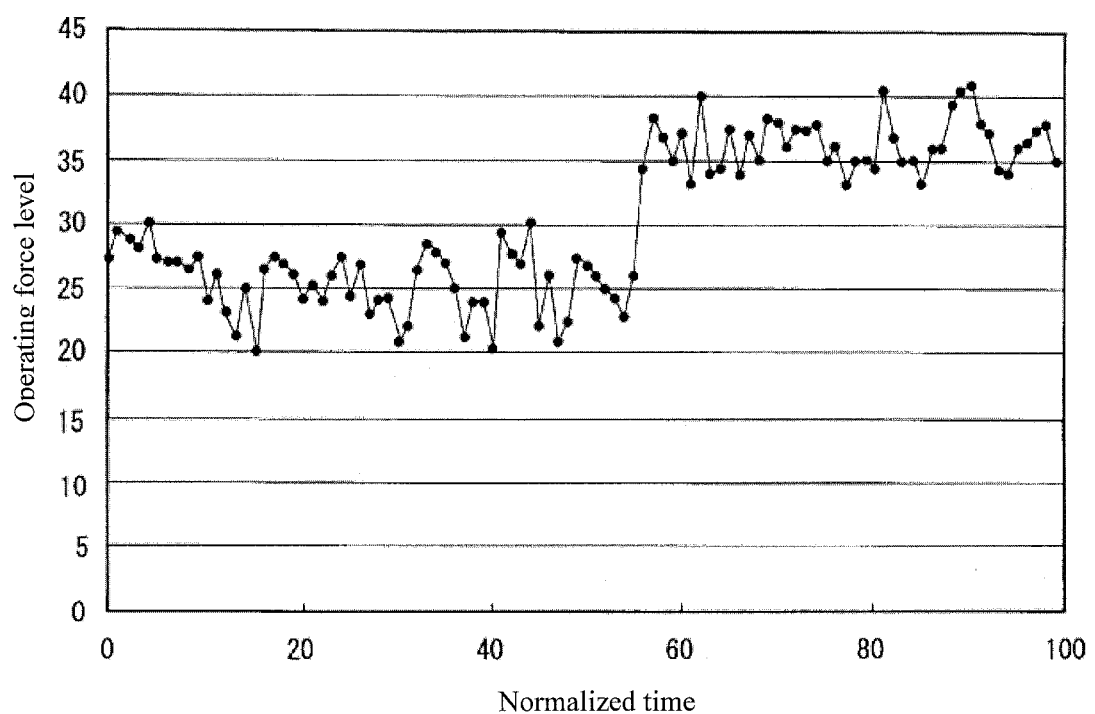
FIG. 8 is a chart illustrating a case where a component caused by walking has been excluded from the operating level acquired from an operating force detecting unit according to one or more embodiments of the present invention.

FIG. 8 is a chart illustrating a case where a component caused by walking has been excluded from the operating level acquired from the operating force detecting unit. The operating force level data illustrated in FIG. 8 is the periodically fluctuating component caused by the walking rhythm of the operator removed from the operating force level based on the operating forced detected by the operating force detecting unit 70. Put another way, the operator is aware of operating (pushing) the ambulatory assist vehicle 1 using an operating force that fluctuates like the data illustrated in FIG. 8 when operating the ambulatory assist vehicle 1.

Furthermore, the power assist force in the power assist device 110 according to the present invention is determined based on a fluctuation in the operating force level like that illustrated in FIG. 8. Because the power assist from the power assist device 110 excludes the component caused by the walking rhythm in this way, a power assist that matches the operator's own walking can be performed. In this way, the power assist of the power assist device 110 can perform a power assist that is synchronized with a sense of operation of the operator and can thus suppress any sense of discomfort on the part of the operator.

The control unit 80 in the power assist device 110 samples the operating force (operating force level) while operation is being performed by the operator and calculates the periodically fluctuating component caused by the walking rhythm of the operator from the history of that operating force level. Furthermore, the control unit 80 records the periodically fluctuating component caused by the walking rhythm of the operator of the operating force level in the recording unit 81.

Furthermore, the control unit 80 calculates a correction value that subtracts the component r caused by the walking rhythm of the operating force level corresponding to the detection time from a normalized operating force level of the operating force level sent from the operating force detecting unit 70. And, furthermore, the control unit 80 determines the power assist force based on the correction value (multiplies the reference value of the power assist force by the correction value).

Therefore, there is a danger that the sense of discomfort will increase when the component caused by the walking rhythm included in the operating force level based on the operating force sent from the operating force detecting unit 70 and the component r caused by the walking rhythm of the operating force level recorded in the recording unit 81 do not accurately match. In order to suppress this sort of increase in the sense of discomfort, the power assist device 110 of the present invention determines the correction value by, for example, the following type of method. The operating force level P based on the operating force detected by the operating force detecting unit 70 is referred to simply as operating force level P in the following description of a method for calculating the correction value.

As described above, the periodically fluctuating component R of the operating force level caused by the walking rhythm changes periodically as illustrated in FIG. 7. The periodically fluctuating component R of the operating force level caused by the walking rhythm during normalized time 0-31 is the component r caused by the walking rhythm of the operating level. In other words, 32 components r caused by the walking rhythm of the operating force level are recorded in the recording unit 81 in association with the normalized time.

The periodically fluctuating component R of the operating force level caused by the walking rhythm repeats 32 pieces of data periodically from 0-31 and is an aggregation of the periodically fluctuating components r caused by the walking of the operating force level during normalized time 0-31. On the other hand, the operating force level P is detected as long as the operating force continues to be detected by the operating force detecting unit 70. Therefore, the component r caused by the walking rhythm of the operating force level corresponding to the operating force level P at the time of detection by the operating force detecting unit 70 (the present) is determined by the following method.

The component r caused by the walking rhythm of the operating force level is included in the operating force level P based on the operating force detected by the operating force detecting unit 70. Therefore, the control unit 80 may accurately synchronize the normalized time during the detection of the operating force level P with the normalized time of the component r caused by the walking rhythm of the operating force level.

Therefore, the control unit 80 divides the normalized time (the present normalized time) of the operating force level P by the number of periodically fluctuating components R (herein, 32) of the operating force level caused by the walking rhythm and seeks to remove excess. The removed excess is an integer from 0-31. Furthermore, the component r caused by the walking rhythm of the operating level of the normalized time is called with the removed excess as the normalize time. The control unit 80 subtracts the component r caused by the walking rhythm of the operating force level from the operating force level P and calculates the correction value. And, furthermore, with a value of a reference value of a pre-determined power assist force multiplied by the correction value as the power assist force, the control unit 80 performs power assist using this power assist force until the time of the detection of the next operating force level P.

By so doing, the accurately corresponding component r caused by the walking rhythm of the operating force level can be removed from the operating force level P that is actually detected. The method described above is one example and that others may be used. For example, the component r caused by the walking rhythm of the operating force level accurately corresponding to the operating force level P can also be selected in a configuration where the timer 82 has a counter that starts the normalized time of the detection time (the present) of the operating force level P at 0 and resets the normalized time at 31.

Figure 9:
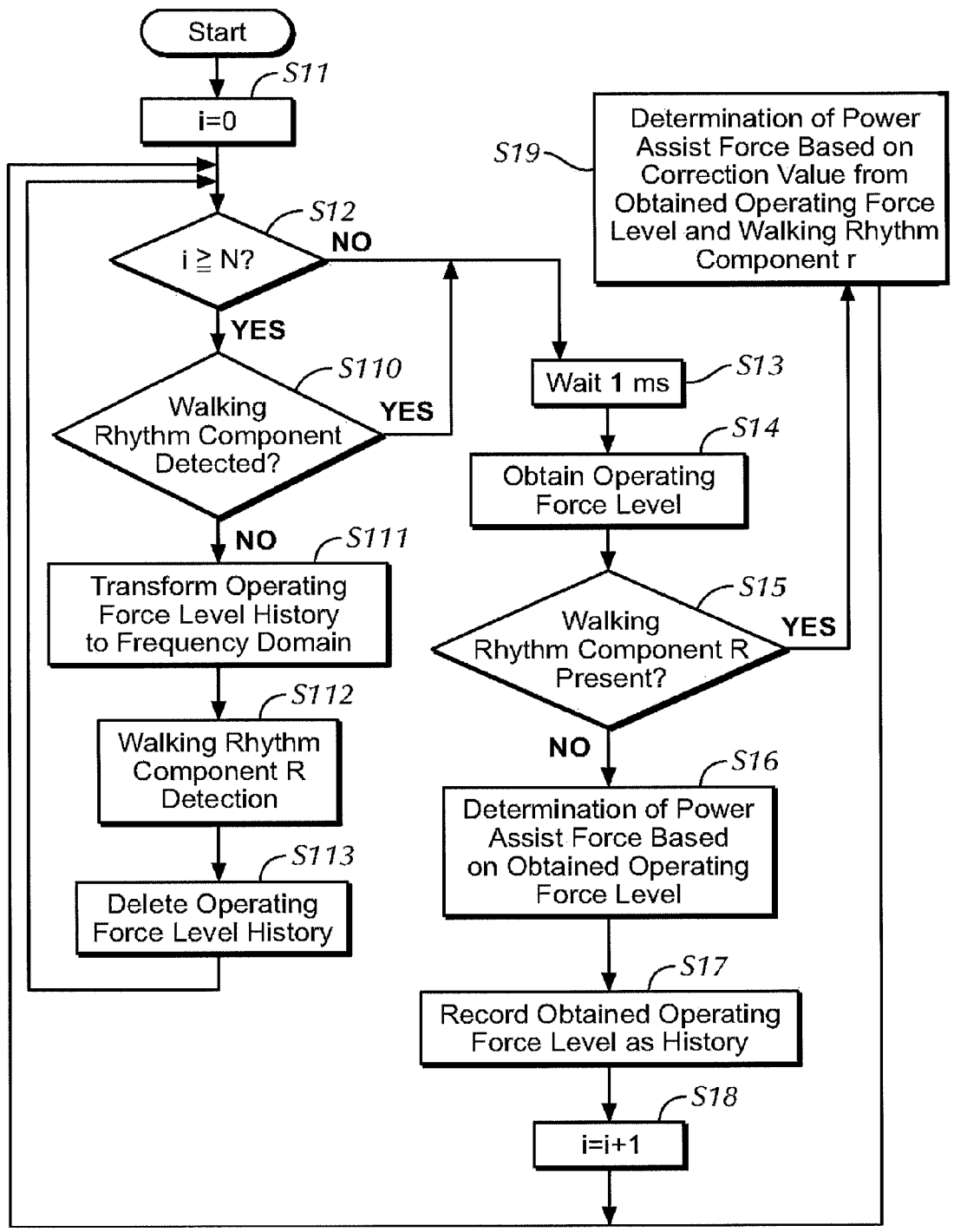
FIG. 9 is a flowchart illustrating the behavior of the ambulatory assist vehicle having the power assist device according to one or more embodiments of the present invention.

Next, the procedure for determining the power assist force of the power assist device of the present invention will be described with reference to the drawings. FIG. 9 is a flowchart illustrating the behavior of the ambulatory assist vehicle having the power assist device according to the present invention. In the power assist device 110 of the present invention, the operating force detecting unit 70 uses the pressure sensor 71 to detect the pressure from the hand of the operator as the operating force and transmits the operating force to the control unit 80.

The control unit 80 normalizes the received operating force using the correction value and calculates the operating force level. Furthermore, the control unit 80 acquires the time from the timer 82 of when the operating force detecting unit 70 detects the operating force (the time from when the operating force detecting unit 70 starts detection of the operating force until detection) and sets the normalized time normalized during the detection period of the operating force. The behavior that detects the operating force level and the corresponding normalized time is referred to simply as obtaining the operating force level in the following description. The graph illustrated in FIG. 3 is a graph of the operating force level and the normalized time. The operating force detection period of the operating force detecting unit 70 is 1 ms.

For a fixed period of time, the control unit 80 records (samples) the history of the operating force level based on the operating forced detected by the pressure sensor 71 of the operating force detecting unit 70. And, furthermore, the control unit 80 detects the periodically fluctuating component of the operating force level caused by the walking rhythm from the history of the sampled operating force level. And then, the control unit 80 calculates the correction value that removes the component that corresponds to the operating force level based on the operating force detected by the operating force detecting unit 70 and that is caused by the walking rhythm of the operating force level and then additionally calculates the power assist force based on the calculation value. And, at this time, the control unit 80 uses a variable i as normalized time in the following description in order to perform this kind of control.

When the operation of the ambulatory assist vehicle 1 starts, the variable i is initialized (step S11). Due to normalized time starting from "0" in the power assist device 110, the variable i is reset to "0" at step S11. The control unit 80 detects periodically fluctuating component R of the operating force caused by the walking rhythm from the histories of N operating force levels sampled over a fixed period of time. And, therefore, the control unit 80 obtains the operating force level from the operating force from the operating force detecting unit 70 until the variable i becomes N−1. Therefore, the control unit 80 determines whether the variable i is at or above a maximum value N (step S12). In one or more embodiments of the present invention, the fixed period of time is until the operating force is detected 32 times (see FIG. 4) and that the maximum value N is 32.

When the variable i is less than the maximum value N (No at step S12), the control unit 80 waits 1 ms (step S13) and obtains the operating force level from the operating force from the operating force detecting unit 70 (step S14). Furthermore, the control unit 80 determines whether the periodically fluctuating component R of the operating force level caused by the walking rhythm has already been detected (step S15).

When the periodically fluctuating component R of the operating force level caused by the walking rhythm has not been detected (No at step S15), the control unit 80 determines the power assist force based on a detection value of the obtained operating force level (step S16). Furthermore, the control unit 80 records (samples) the operating force level obtained at step S14 along with the normalized time of the time of obtaining in the recording unit 81 (step S17) as history and then adds 1 to the variable i (step S18). After that, the control unit 80 returns to step S12 and repeats the behavior. Although omitted from the drawings, the control unit 80 may simultaneously determine the power assist force, send instructions to the motor driver circuit 91, drive the electric motor 92, and provide the assist power to the drive wheel 61 at step S16.

When the periodically fluctuating component R of the operating force level caused by the walking rhythm has already been detected (Yes at step S15), the control unit 80 calls the component r caused by the walking rhythm of the operating force level. At this time, the control unit 80 selects and calls the corresponding component r caused by the walking rhythm of the operating force level from the periodically fluctuating component R of the operating force level caused by the walking rhythm recorded in the recording unit 81. Furthermore, the control unit 80 subtracts the called component r caused by the walking rhythm of the operating level from the operating force level obtained in step S14, calculates the correction value and determines the power assist force based on the correction value (step S19). And, here too, the control unit 80 may cause the same behavior of the electric motor 92 using the determined power assist force as was described above.

The periodically fluctuating component R of the operating force level caused by the walking rhythm is a value that repeats periodically. When the variable i is less than the maximum value N, the control unit 80 can obtain an accurate value by selecting the component r caused by the walking rhythm of the operating force level corresponding to the variable i from the periodically fluctuating component R of the operating force level caused by the walking rhythm.

Furthermore, when the variable i is at or greater than the maximum value N (Yes at step S12), the control unit 80 determines whether the periodically fluctuating component R of the operating force level caused by the walking rhythm has already been detected (step S110). When the periodically fluctuating component R of the operating force level caused by the walking rhythm has already been detected (Yes at step S110), the process proceeds to step S13 and then performs the control described above.

When the periodically fluctuating component R of the operating force level caused by the walking rhythm has not been detected (No at step S110), the control unit 80 transforms the histories of N operating force levels recorded in the recording unit 81 into a frequency domain (step S111). Furthermore, the control unit 80 detects the periodically fluctuating component R of the operating force level caused by the walking rhythm (step S112). The detection of the periodically fluctuating component R of the operating force level caused by the step S112 walking rhythm is performed by the method described above. The histories of the operating force levels (sampled data) are not needed after the periodically fluctuating component R of the operating force level caused by the walking rhythm is detected and are thus all deleted (step S113). After that, the process returns to step S12 and continues the determination of the power assist force.

The power assist device 110 of the present invention uses as the power assist force the reference value of the power assist force multiplied by the correction value that subtracts the component r caused by the walking rhythm of the operating force level corresponding to the current operating force level from the current operating force level, but is not limited to this. For example, a table associating the correction value with the power assist force recorded in recording unit 82 may be prepared and the power assist force may be determined from the table.

In one or more embodiments of the present invention, the power assist device 110 cannot detect the periodically fluctuating component caused by the walking rhythm of the operating force when there is little history recorded in the recording unit 81. Therefore, the power assist force is the reference value of the power assist force multiplied by the operating force normalized of the operating force detected by the operating force detecting unit 70. But the present invention is not limited to this and a periodically fluctuating component R of the operating force level caused by the walking rhythm that is either prepared beforehand or detected in the previous operation may be used so as to calculate the correction value. Furthermore, the variable i showing the normalized time continuously increases in one or more embodiments of the present invention, but may be configured to match the number of periodically fluctuating components caused by the walking rhythm of the operating force level, that is, so as to reset at 32. In this case, resetting may be performed in the same way as in step S11 between step S110 and step S13.

Second Example

Figure 10:
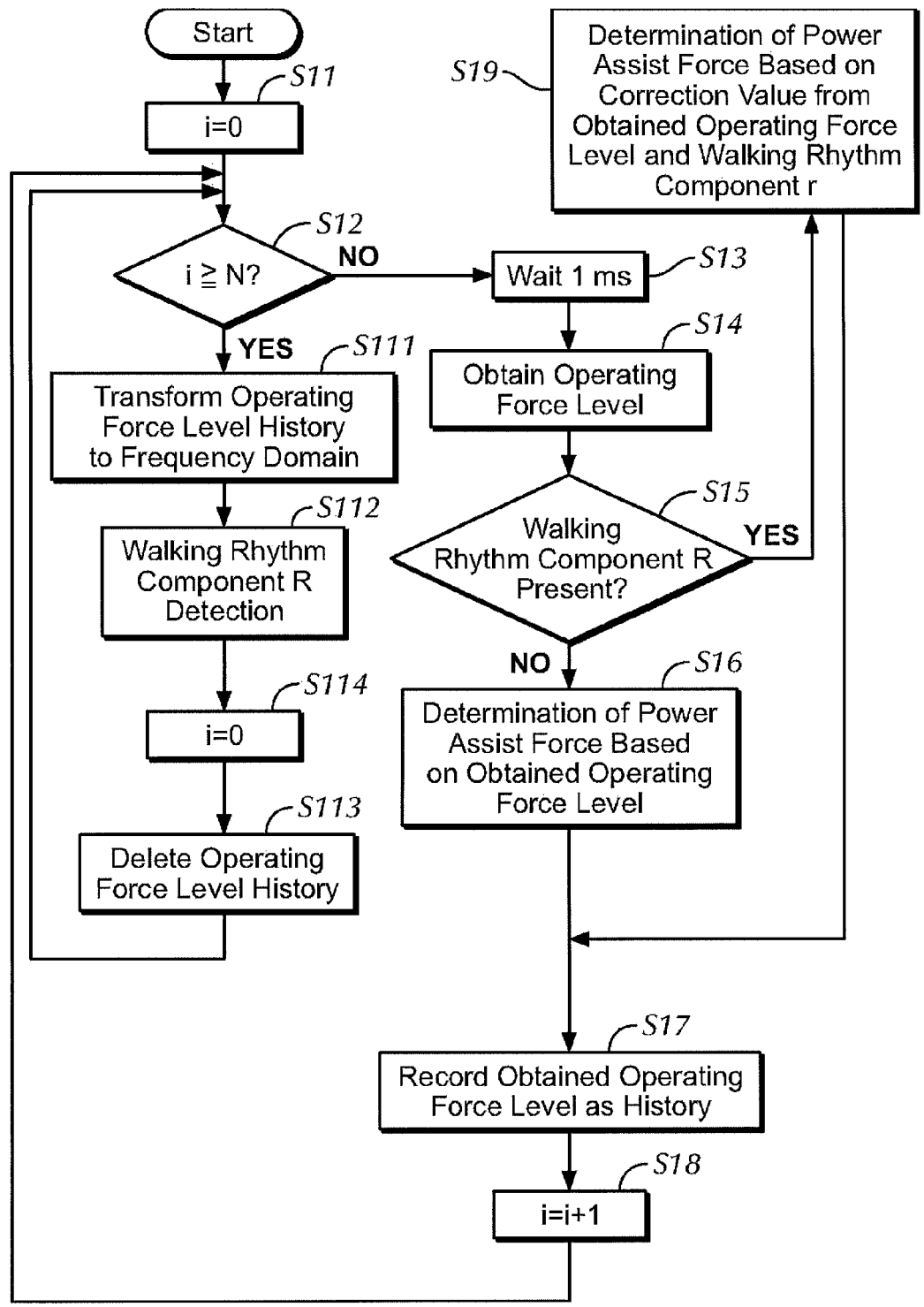
FIG. 10 is a flowchart illustrating the behavior of the ambulatory assist vehicle having the power assist device according to one or more embodiments of the present invention.

The procedure for determining the power assist force of the power assist device of one or more embodiments of the present invention will be described with reference to the drawings. FIG. 10 is a flowchart illustrating the behavior of the ambulatory assist vehicle having the power assist device according to the present invention. While the method for determining the power assist force may be different in one or more embodiments of the present invention, the ambulatory assist vehicle 1 and the power assist device 110 may be the same or substantially similar as in one or more embodiments of the first example of the present invention and thus that the same reference numerals are affixed to portions that are substantially the same and detailed descriptions of portions that are the same are omitted.

The flowchart illustrated in FIG. 10 is a configuration that eliminates step S110 from the flowchart in FIG. 9, proceeds to step S17 after step S19 and provides step S114 between step S112 and S113. Step S114 is a step that resets the value of the variable i that shows the normalized time and is thus the same as step S11 and the details thereof are omitted.

The configuration of the power assist device 110 of one or more embodiments of the first example of the present invention performed detection of the periodically fluctuating component R of the operating force level caused by the walking rhythm only once. With this configuration, the periodically fluctuating component R of the operating force level caused by the walking rhythm of the operator is detected only once during operation of the ambulatory assist vehicle 1 and thus control is easy.

On the other hand, there are cases, such as fatigue, looking away and conversations with travel companions and the like, where the walking rhythm changes and, in these cases, it becomes difficult to accurately synchronize the power assist force with the walking rhythm of the operator by detecting the periodically fluctuating component R of the operating force level caused by the walking rhythm only once. Therefore, with the method for determining the power assist force illustrated in one or more embodiments of the second example of the present invention, the periodically fluctuating component R of the operating force level caused by the walking rhythm is detected at fixed periods of time.

With the method for determining the power assist force illustrated in one or more embodiments of the second example of the present invention, the operating force level is recorded in the recording unit 81 after the power assist force is determined (step S16 and step S19) whether or not there is a periodically fluctuating component R of the operating force level caused by the walking rhythm. Furthermore, the variable i is reset (step S114) after the periodically fluctuating component R of the operating force level caused by the walking rhythm is detected.

That is, with the method for determining the power assist force illustrated in one or more embodiments of the second example of the present invention, the history of the operating force level is obtained (sampled) even while the power assist force is being determined and the variable i is reset each time the periodically fluctuating component R of the operating force level caused by the walking rhythm is detected from the history of the operating force level.

By so doing, a power assist device 110 that is able to perform power assist with little sense of discomfort can be provided by detecting a corresponding periodically fluctuating component R of the operating force level caused by the walking rhythm even when the walking rhythm of the operator changes. In one or more embodiments of the present invention, the configuration continuously detects the periodically fluctuating component R of the operating force level caused by the walking rhythm, but that this is not limited thereto. For example, the periodically fluctuating component R of the operating force level caused by the walking rhythm may be detected after a fixed period of time passes. Further, control may be performed that forms a loop that repeats from step S13 to step S16 or step S19 a fixed number of times and then exits the loop after a predetermined amount of time has passed.

Characteristics other than these may be the same or substantially similar as those of one or more embodiments of the first example of the present invention.

Third Example

Figure 11:
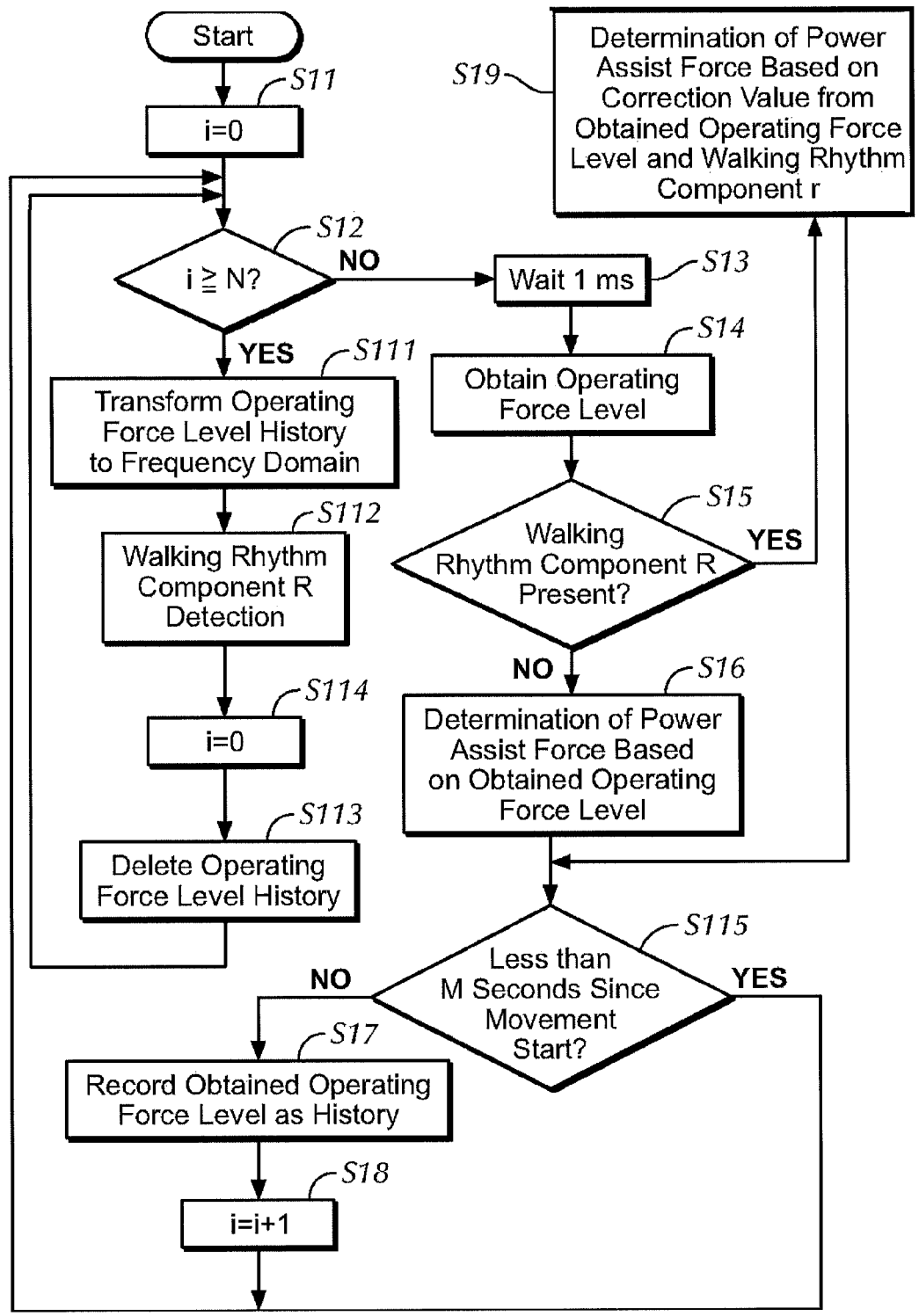
FIG. 11 is a flowchart illustrating the behavior of the ambulatory assist vehicle having the power assist device according to one or more embodiments of the present invention.

The procedure for determining the power assist force of the power assist device according to one or more embodiments of the present invention will be described with reference to the drawings. FIG. 11 is a flowchart illustrating the behavior of the ambulatory assist vehicle having the power assist device according to the present invention. While the method for determining the power assist force may be different in one or more embodiments of the present invention, the ambulatory assist vehicle 1 and the power assist device 110 may be the same or substantially similar as in one or more embodiments of the first example of the present invention and thus that the same reference numerals are affixed to portions that are substantially the same and detailed descriptions of portions that are the same are omitted.

The flowchart illustrated in FIG. 11 has step S115 that determines whether or not a fixed period of time has passed since the start of movement, between step S17 and step S16 or step S19 of the flowchart in FIG. 10.

A large operating force is required when pushing the ambulatory assist vehicle 1 immediately after the start of movement when compared with that required while moving stably. In other words, the operating force fluctuates widely immediately after the start of the movement of the ambulatory assist vehicle 1 when the operator operates the ambulatory assist vehicle 1. It may be difficult to obtain an accurate value when the periodically fluctuating component R of the operating force level caused by the walking rhythm is detected in this time period because the required operating force is being applied at the start of the movement of the ambulatory assist vehicle 1. Therefore, with the power assist device 110, detection of the periodically fluctuating component R of the operating force level caused by the walking rhythm is avoided until a fixed period of time has passed from the start of the movement of the ambulatory assist vehicle 1.

With the power assist device 110 according to one or more embodiments of the third example of the present invention, it is determined whether a period of M seconds has passed from the start of the movement of the ambulatory assist vehicle 1 (step S115) after the power assist force has been determined (step S16 and step S19). When M seconds have passed from the start of movement (No at step S115), the history of the operating force level is recorded (step S17) and the variable i is updated (step S18). Conversely, when M seconds have not passed from the start of movement (Yes at step S115) the history of the operating force level is not recorded (step S17) and the variable i is not updated (step S18) and the process proceeds to step S12.

By avoiding the recording of the history of the operating force level caused by the walking rhythm immediately after the movement of the ambulatory assist vehicle 1, the periodically fluctuating component R of the operating force level caused by the walking rhythm can be detected accurately. The M seconds from the start of movement may be any setting and a predetermined value may also be used.

In one or more embodiments of the present invention, the method for detecting the start of movement in the ambulatory assist vehicle 1 can be that of the time when one or more of the detection of the rotation of the drive wheel 31, the detection of the input of the operating force or the detection of movement through the motion sensor unit 60 are detected, but is not limited thereto.

When the operator operates (pushes) the ambulatory assist vehicle 1, the fluctuation of the operating force becomes signification in a portion of rapidly fluctuating speed of the ambulatory assist vehicle 1 and thus it becomes difficult to accurately detect the periodically fluctuating component R of the operating force level caused by the walking rhythm. With one or more embodiments of the third example of the present invention, it is known beforehand that this rapid fluctuation of speed will occur after the start of movement of the ambulatory assist vehicle 1 and thus the detection of the periodically fluctuating component R of the operating force level caused by the walking rhythm of this time period can be avoided. However, this is not limited thereto and, for example, the motion sensor 60 and the drive wheel 31 and the like may be used and the time when the speed of the ambulatory assist vehicle 1 on a flat pathway fluctuates detected and the history of that time used as the periodically fluctuating component R of the operating force level caused by the walking rhythm immediately after the movement of the ambulatory assist vehicle 1.

Characteristics other than these may be the same or substantially similar as those of one or more embodiments of the first example through the second example of the present invention.

Fourth Example

Figure 12:
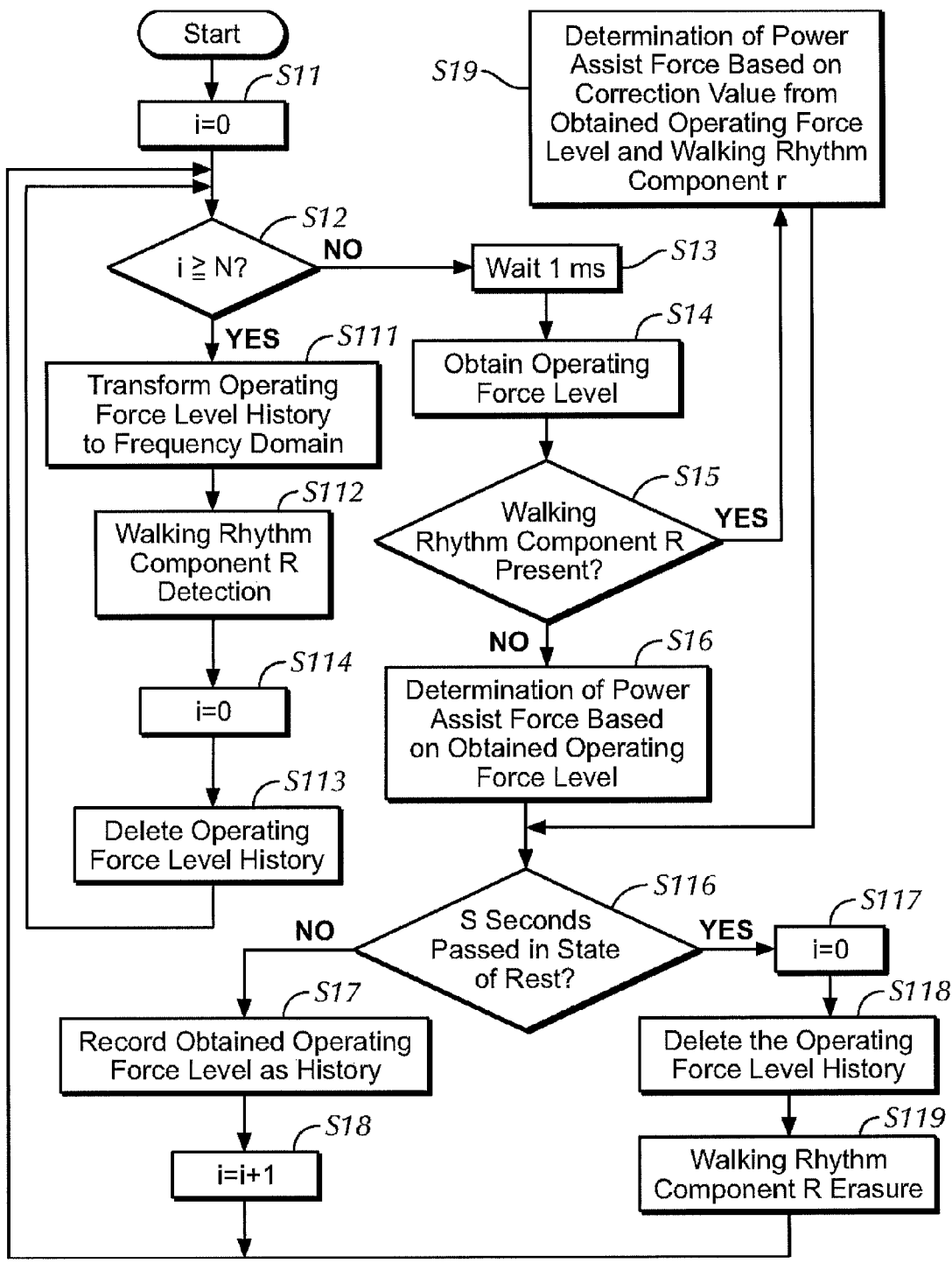
FIG. 12 is a flowchart illustrating the behavior of the ambulatory assist vehicle having the power assist device according to one or more embodiments of the present invention.

The procedure for determining the power assist force of the power assist device according to one or more embodiments of the present invention will be described with reference to the drawings. FIG. 12 is a flowchart illustrating the behavior of the ambulatory assist vehicle having the power assist device according to the present invention. While the method for determining the power assist force may be different in one or more embodiments of the present invention, the ambulatory assist vehicle 1 and the power assist device 110 may be the same or substantially similar as in the first example of one or more embodiments of the present invention and thus that the same reference numerals are affixed to portions that are substantially the same and detailed descriptions of portions that are the same are omitted.

The flowchart illustrated in FIG. 12 has step S116 that determines whether or not the ambulatory assist vehicle 1 has been at rest for a fixed period of time, between step S17 and step S16 or step S19 of the flowchart in FIG. 10. Furthermore, variable i reset (step S117), the deletion of the history of the operating force level (step S118) and the erasure of the periodically fluctuating component R of the operating force level caused by the walking rhythm (step S119) are provided.

When the ambulatory assist vehicle 1 is at rest for a fixed period of time, it can be presumed that the operator has become separated from the ambulatory assist vehicle 1. Furthermore, there are cases where when the movement starts after this, the current operator is different than the operator prior to the rest. Furthermore, walking rhythm nearly always changes with each operator and thus there are cases where the operator is given a sense of discomfort when a periodically fluctuating component R of the operating force level caused by the walking rhythm detected based on the operating force of another operator is used for the determination of the power assist force. Therefore, with the power assist device 110, the control unit 80 determines that it is possible the operator has switched when the resting time exceeds a fixed period of time and thus revises the periodically fluctuating component R of the operating force level caused by the walking rhythm.

With the power assist device 110 according to one or more embodiments of the fourth example of the present invention, it is determined whether a period of S seconds has passed with the ambulatory assist vehicle 1 in a state of rest (step S116) after the power assist force has been determined (step S16 and step S19). When S seconds have not passed in the state of rest (No at step S116), the control unit 80 recognizes a temporary stop such as a wait for a signal and the like and thus records this as history of a detected force level (step S17) and updates the variable i (step S18). When S seconds have passed in the state of rest (Yes at step S116), the control unit 80 determines that the operator has become separated from the ambulatory assist vehicle 1. And, furthermore, the control unit 80 starts a record for a new operator since there are cases where the operator changes. That is, when S seconds have passed in the state of rest (Yes at step S116), the control unit 80 resets the variable i (step S117), erases the operating level history (step S118) and erases the periodically fluctuating component R of the operating force level caused by the walking rhythm. After that, the process moves to step S12 and repeats the determination of the power assist force.

By determining whether or not to record the history of the operating force level based on the continuous time of the state of rest of the ambulatory assist vehicle 1 in this way, it is possible to stop the recording of the operating force level when at rest for a long period of time. Furthermore, the recording of the operating level is started over even in cases where the operator has changed after resting for a long period of time and thus a periodically fluctuating component R of the operating force level caused by the walking rhythm appropriate for the operator can be accurately detected. The passage time of S seconds during the state of rest may be any setting and a predetermined value may also be used.

The method for detecting the state of rest of the ambulatory assist vehicle 1 can be that of the time when one or more of the detection of the rotation of the drive wheel 31, the detection of the input of the operating force or the detection of movement through the motion sensor unit 60 are detected, but is not limited thereto.

In one or more embodiments of each example of the present invention described above, the operating force detecting unit 70 assumed the operator pushed the grip 22 of the grip part 20 of the ambulatory assist vehicle 1 and so disposed the pressure sensor 71, but the pressure sensor 71 may also be disposed so as to respond when the grip 22 is pulled. When a pressure sensor 71 that is able to detect operating force on a pushed side and operating force on a pulled side is disposed, it also becomes possible to detect operating force that acts when the operator pulls the ambulatory assist vehicle 1 such as on a downward slope and the like. Furthermore, by detecting this type of operating force, the power assist device 110 is able to provide the power assist force so as to suppress the downward acceleration of the ambulatory assist vehicle 1 on a downward slope.

Characteristics other than these may be the same or substantially similar as one or more embodiments of those of the first example through the third example of the present invention.

Fifth Example

Figure 13:
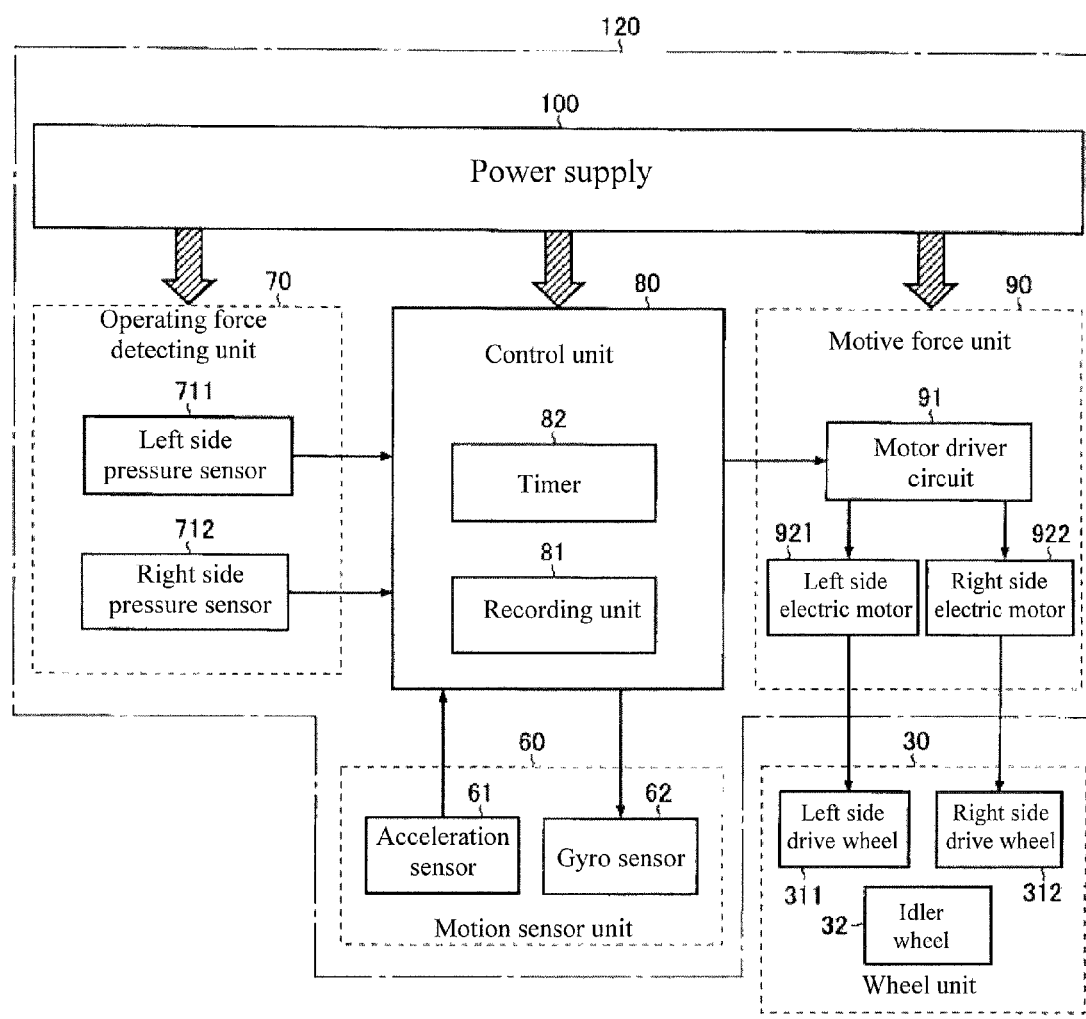
FIG. 13 is a block diagram of one example of a power assist device according to one or more embodiments of the present invention.

Another example of an ambulatory assist vehicle having the power assist device according to one or more embodiments of the present invention will be described with reference to the drawings. FIG. 13 is a block diagram of one example of a power assist device according to one or more embodiments of the present invention and FIG. 14 is an enlarged view of a grip part that includes the operating force detecting unit of the power assist device illustrated in FIG. 13.

As illustrated in FIG. 13, the operating force detecting unit 70 of a power assist device 120 has a left side pressure sensor 711 and a right side pressure sensor 712. Furthermore, the motive force unit 90 has a left side electric motor 921 and a right side electric motor 922. Furthermore, the left side electric motor 921 and the right side electric motor 922 are made so as to drive a left side drive wheel 311 and a right side drive wheel 312, respectively. Portions other than these may be the same or substantially similar as the power assist device 110 illustrated in FIG. 2 and thus the same reference numerals are affixed to portions that are substantially the same and detailed descriptions of portions that are the same are omitted.

Figure 14:
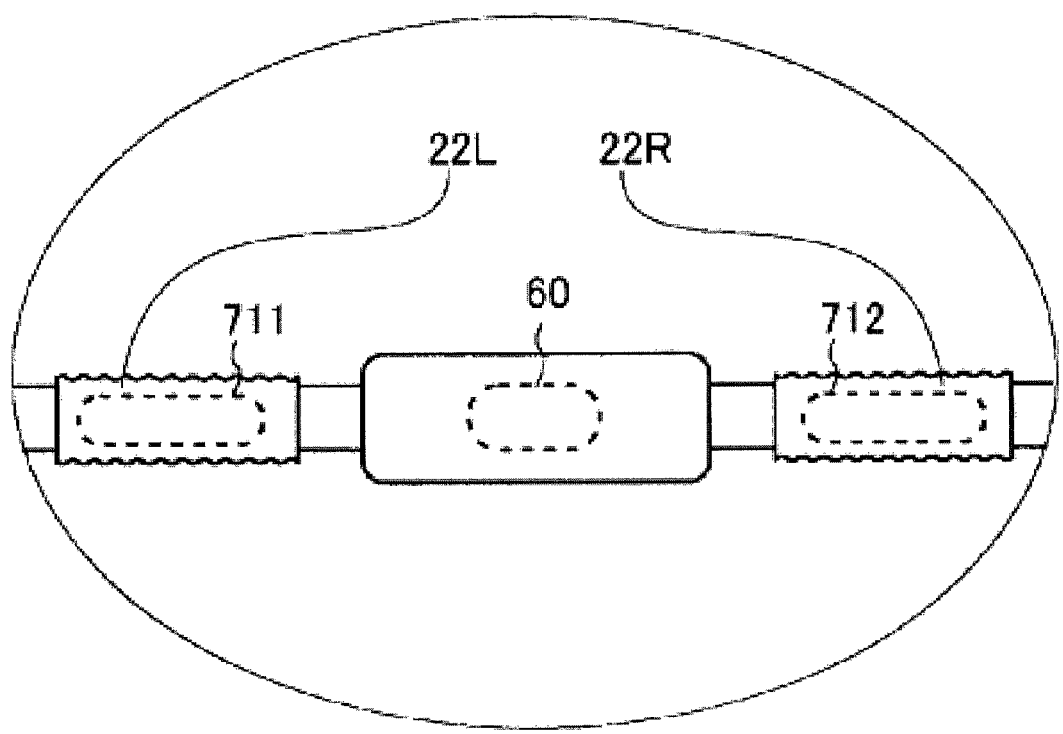
FIG. 14 is an enlarged view of a grip part that includes the operating force detecting unit of the power assist device illustrated in FIG. 13 according to one or more embodiments of the present invention.

As illustrated in FIG. 14, the operating force detecting unit 70 provides the left side pressure sensor 711 inside a left side grip 22L and provides the right side pressure sensor 712 inside a right side grip 22R of the grip part 20. Furthermore, the left side pressure sensor 711 and the right side pressure sensor 712 are each independent and are able to detect pressure (operating force). When the operator grips both the left side grip 22L and the right side grip 22R of the grip part 20 to operate the ambulatory assist vehicle 1, both pressure sensors 711 and 712 detect the operating force.

Furthermore, the control unit 80 detects the periodically fluctuating component R of the operating force level caused by the walking rhythm from the operating force detected by the left side pressure sensor 711 and performs driving control (power assist control) for the left side electric motor 921. The control unit 80 also detects the periodically fluctuating component R of the operating force level caused by the walking rhythm from the operating force detected by the right side pressure sensor 712 and performs driving control (power assist control) for the right side electric motor 922.

Therefore, the power assist device 120 is made so as to be able to provide power assist force to the left side drive wheel 311 and the right side drive wheel 312 independently. By configuring so that power assist based on the operating force from the left hand of the operator and power assist based on the operating force from the right hand are performed independently in this way, a power assist can be performed that suppresses a sense of discomfort in the operator generated by left and right differences in the fluctuation of the walking rhythm.

Characteristics other than these may be the same or substantially similar as those of one or more embodiments of the first example through the fourth example of the present invention.

As described above, an ambulatory assist vehicle pushed by an operator is given as the object to be operated that uses the power assist device according to the present invention, but is not limited thereto. The power assist device according to the present invention can be used on objects to be operated where the operator performs operations by periodically fluctuating operating force such as wagons, power-assisted bicycles and the like. Furthermore, torque through an electric motor is given as the example of the power assist force that is output, but is not limited thereto and may also be made so as to output power assist force that moves linearly like a linear motor.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE NUMERALS

1 Ambulatory assist vehicle
10 Vehicle body part
11 Baggage compartment
20 Grip part
21 Support part
22 Grip
22L, 22R Grips
30 Wheel unit
31 Drive wheel
311 Left side drive wheel
312 Right side drive wheel
32 Idler wheel
40 Top plate part
50 Backrest part
60 Motion sensor unit
61 Acceleration sensor
62 Gyro sensor
70 Operating force detecting unit (e.g., pressure sensor)
71 Pressure sensor
711 Left side pressure sensor
712 Right side pressure sensor
80 Control unit (e.g., controller)
81 Recording unit
82 Timer
90 Motive force unit (e.g., motor)
91 Motor driver circuit
92 Electric motor
921 Left side electric motor
922 Right side electric motor
100 Power supply
110, 120 Power assist devices

What is claimed is:

1. A power assist device for assisting a user to operate an object, comprising:
    a pressure sensor that detects an operating force applied to the object by the user;
    a motor that outputs and applies a motive force to the object; and
    a controller that:
        records a history of the operating force detected by the pressure sensor;
        detects a periodically fluctuating component of the operating force based on the history of the operating force;
        calculates a component of a current operating force caused by motion of the user operating the object;
        calculates a correction value that excludes the component caused by motion of the user from the current operating force;
        calculates a power assist force based on the correction value; and
        outputs the power assist force as the motive force of the motor.

2. The power assist device according to claim 1, wherein the controller detects the periodically fluctuating component of the operating force every time a fixed amount of time passes while the user is operating the object.

3. The power assist device according to claim 1, wherein the controller uses the history of the operating force only after a predetermined amount of time passes after the user starts operating the object to detect the periodically fluctuating component of the operating force.

4. The power assist device according to claim 2, wherein the controller uses the history of the operating force only after a predetermined amount of time passes after the user starts operating the object to detect the periodically fluctuating component of the operating force.

5. The power assist device according to claim 1, further comprising:
    a motion sensor that detects a resting state of the object,
        wherein the controller erases the history of the operating force and the periodically fluctuating component of the operating force when the motion sensor detects that the resting state of the object has exceeded a fixed amount of time.

6. The power assist device according to claim 2, further comprising:
    a motion sensor that detects a resting state of the object,
        wherein the controller erases the history of the operating force and the periodically fluctuating component of the operating force when the motion sensor detects that the resting state of the object has exceeded a fixed amount of time.

7. The power assist device according to claim 3, further comprising:
    a motion sensor that detects a resting state of the object,
        wherein the controller erases the history of the operating force and the periodically fluctuating component of the operating force when the motion sensor detects that the resting state of the object has exceeded a fixed amount of time.

8. An ambulatory assist vehicle comprising a wheel and the power assist device according to claim 1, wherein the motor applies the power assist force to the wheel of the ambulatory assist vehicle.

9. The ambulatory assist vehicle according to claim 8, wherein the periodically fluctuating component of the operating force applied by the user and detected by the controller is caused by the user walking.

10. The ambulatory assist vehicle according to claim 8, wherein the controller detects the periodically fluctuating component of the operating force every time a fixed amount of time passes while the user is operating the object.

11. The ambulatory assist vehicle according to claim 8, wherein the controller uses the history of the operating force only after a predetermined amount of time passes after the user starts operating the object to detect the periodically fluctuating component of the operating force.

12. The ambulatory assist vehicle according to claim 8, wherein the power assist device further comprises:
a motion sensor that detects a resting state of the object,
wherein the controller erases the history of the operating force and the periodically fluctuating component of the operating force when the motion sensor detects that the resting state of the object has exceeded a fixed amount of time.

13. The power assist device according to claim 1, wherein the component caused by the motion of the user is calculated based on frequency and amplitude of the periodically fluctuating component.

14. A method of operating a power assist device for assisting a user to operate an object, comprising:
detecting an operating force applied to the object by the user;
outputting and applying a motive force to the object;
recording a history of the detected operating force;
detecting a periodically fluctuating component of the operating force based on the history of the operating force;
calculating a component of a current operating force caused by motion of the user operating the object;
calculating a correction value that excludes the component caused by the motion of the user from the current operating force;
calculating a power assist force based on the correction value; and
outputting the power assist force as the motive force.

15. The method according to claim 14, further comprising detecting the periodically fluctuating component of the operating force every time a fixed amount of time passes while the user is operating the object.

16. The method according to claim 14, further comprising using the history of the operating force only after a predetermined amount of time passes after the user starts operating the object to detect the periodically fluctuating component of the operating force.

17. The method according to claim 14, further comprising:
detecting a resting state of the object; and
erasing the periodically fluctuating component of the operating force upon detecting that the resting state of the object has exceeded a fixed amount of time.

18. The method according to claim 14, further comprising applying the power assist force to a wheel of an ambulatory assist vehicle, wherein the ambulatory assist vehicle is the object that is operated.

19. The method according to claim 14, further comprising calculating the component caused by the motion of the user based on frequency and amplitude of the periodically fluctuating component.

20. The power assist device according to claim 1, wherein the periodically fluctuating component of the operating force applied by the user is caused by the user walking.

* * * * *